United States Patent
Montojo et al.

(10) Patent No.: US 8,792,426 B2
(45) Date of Patent: Jul. 29, 2014

(54) METHOD AND APPARATUS FOR RESOURCE MANAGEMENT IN A WIRELESS COMMUNICATION SYSTEM

(75) Inventors: Juan Montojo, San Diego, CA (US); Tao Luo, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 646 days.

(21) Appl. No.: 12/402,349

(22) Filed: Mar. 11, 2009

(65) Prior Publication Data

US 2009/0238131 A1    Sep. 24, 2009

Related U.S. Application Data

(60) Provisional application No. 61/038,875, filed on Mar. 24, 2008.

(51) Int. Cl.
*H04J 11/00* (2006.01)
*H04W 4/00* (2009.01)

(52) U.S. Cl.
USPC ........... 370/329; 370/208; 370/209; 370/210; 370/328; 370/330

(58) Field of Classification Search
None
See application file for complete search history.

(56) References Cited

U.S. PATENT DOCUMENTS 5,926,469 A    7/1999  Norstedt et al.
7,778,148 B2 *  8/2010  Lee et al. ............... 370/204
7,852,806 B2   12/2010  Ahn et al.
(Continued)

FOREIGN PATENT DOCUMENTS

CN   101383648 A    3/2009
KR   20070104633 A  10/2007
(Continued)

OTHER PUBLICATIONS

Nortel, "PHICH Mapping for 4-tx System" 3GPP Draft; R1-080376 (Nortelphich Mapping 4 TX), 3rd Generation Partnership Project(3GPP), Mobile Competence Centre; 650, Route Des Lucioles; F-06921 Sophia-Antipolis Cedex; France, vol. RAN WG1, No. Sevilla, Spain; Jan. 14, 2008, Jan. 7, 2008 (Jan. 7, 2009), XP050108895 p. 1-p. 2.*

(Continued)

*Primary Examiner* — Faruk Hamza
*Assistant Examiner* — Diane Lo
(74) *Attorney, Agent, or Firm* — Liem T. Do

(57) ABSTRACT

Systems and methodologies are described that facilitate improved resource management in a wireless communication system. As described herein, supergroups can be formed from groups of Physical Hybrid Automatic Repeat Request Channels (PHICHs) such that respective PHICH supergroups are multiplexed onto respective non-overlapping resource element subsets, thereby improving resource usage efficiency for the extended cyclic prefix case and limited numbers of transmit antennas. In one example described herein, even-indexed PHICH groups are mapped to a selected subset of resource elements in a group while odd-indexed PHICH groups are mapped to the remaining resource elements in the group. This mapping can be performed by modifying orthogonal sequences associated with the PHICH groups and/or by performing resource mapping in different manners for respective PHICH supergroups. Upon receiving a transmission of mapped PHICH information, a receiving entity can leverage knowledge of the mapping to decode transmitted PHICH information using the proper resource subset(s).

36 Claims, 15 Drawing Sheets

(56) References Cited

U.S. PATENT DOCUMENTS

| | | | |
|---|---|---|---|
| 7,894,330 B2* | 2/2011 | Lee et al. | 370/208 |
| 2009/0109906 A1* | 4/2009 | Love et al. | 370/329 |
| 2009/0201863 A1* | 8/2009 | Pi | 370/329 |
| 2010/0260115 A1* | 10/2010 | Frederiksen et al. | 370/329 |
| 2010/0284347 A1* | 11/2010 | Ahn et al. | 370/329 |
| 2011/0032851 A1* | 2/2011 | Anderson | 370/280 |

FOREIGN PATENT DOCUMENTS

| | | |
|---|---|---|
| KR | 20070117661 A | 12/2007 |
| RU | 2198474 | 2/2003 |
| TW | 200727640 | 7/2007 |
| WO | WO2006099577 A1 | 9/2006 |
| WO | WO2006132835 A2 | 12/2006 |
| WO | 2009104880 A1 | 8/2009 |

OTHER PUBLICATIONS

International Search Report and Written Opinion—PCT/US2009/038039, International Search Authority—European Patent Office—Sep. 1, 2009.

LG Electronics, "PHICH to transmit antenna mapping in case of extended CP" 3GPP Draft; R1-080259 Downlink PHICH Structure in Extended CP, 3RD Generation Partnership Project (3GPP), Mobile Competence Centre ; 650, Route Des Lucioles ; F-06921 Sophia-Antipolis Cedex ; France, vol. RAN WG1, No. Sevilla, Spain; 20080114, Jan. 8, 2008, XP050108781 figures 1,2,4.

Nortel, "4-Tx Transmit Diversity for PHICH Channel" SGPP Draft; R1-073961 (Nortel-4TX TXD PHICH), 3rd Generation Partnership Project (3GPP), Mobile Competence Centre ; 650, Route Des Lucioles ; F-06921 Sophiaantipolis Cedex ; France, vol. RAN WG1, No. Shanghai, China; Oct. 8, 2007, Oct. 2, 2007, XP050107519 the whole document.

Nortel, "PHICH Mapping for 4-tx System" 3GPP Draft; R1-080376 (Nortelphich Mapping 4 TX), 3rd Generation Partnership Project (3GPP), Mobile Competence Centre ; 650, Route Des Lucioles ; F-06921 Sophia-Antipolis Cedex ; France, vol. RAN WGI, No. Sevilla, Spain; Jan. 14, 2008, Jan. 1, 2008, XP050108895 p. 1-p. 2.

QUALCOMM Europe, "Specification details for PHICH transmission for extended CP" 3GPP Draft; R1-081959, 3rd Generation Partnership Project (3GPP), Mobile Competence Centre ; 650, Route Des Lucioles ; F-06921 Sophia-Antipolis Cedex; France, vol. RAN WG1, No. Kansas City, USA; May 5, 2008, Apr. 29, 2008, XP050110309 the whole document.

3rd Generation Partnership Project; Technical Specification Group Radio Access Network; Evolved Universal Terrestrial Radio Access (E-UTRA); Physical Channels and Modulation (Release 8); 3GPP TS 36.211 V8.1.0 (Nov. 2007).

Taiwan Search Report—TW098109571—TIPO—Dec. 11, 2012.

* cited by examiner

METHOD AND APPARATUS FOR RESOURCE MANAGEMENT IN A WIRELESS COMMUNICATION SYSTEM

CROSS-REFERENCE

This application claims the benefit of U.S. Provisional Application Ser. No. 61/038,875, filed Mar. 24, 2008, and entitled "METHOD AND APPARATUS FOR TRANSMIT DIVERSITY SCHEMES IN LTE," the entirety of which is incorporated herein by reference.

BACKGROUND

I. Field

The present disclosure relates generally to wireless communications, and more specifically to techniques for resource management in a wireless communication system.

II. Background

Wireless communication systems are widely deployed to provide various communication services; for instance, voice, video, packet data, broadcast, and messaging services can be provided via such wireless communication systems. These systems can be multiple-access systems that are capable of supporting communication for multiple terminals by sharing available system resources. Examples of such multiple-access systems include Code Division Multiple Access (CDMA) systems, Time Division Multiple Access (TDMA) systems, Frequency Division Multiple Access (FDMA) systems, and Orthogonal Frequency Division Multiple Access (OFDMA) systems.

Generally, a wireless multiple-access communication system can simultaneously support communication for multiple wireless terminals. In such a system, each terminal can communicate with one or more base stations via transmissions on the forward and reverse links. The forward link (or downlink) refers to the communication link from the base stations to the terminals, and the reverse link (or uplink) refers to the communication link from the terminals to the base stations. This communication link can be established via a single-in-single-out (SISO), multiple-in-signal-out (MISO), or a multiple-in-multiple-out (MIMO) system.

Control transmissions are prepared in various wireless communication system implementations by mapping a series of modulation symbols corresponding to the transmissions to be conducted to respective layers, precoding the respective layer-mapped streams, and mapping the precoding output to one or more groups of available resource elements. However, for some control channels, such as the Physical Hybrid Automatic Repeat Request (HARQ) Indicator Channel (PHICH), application of conventional layer mapping, preceeding, and/or resource mapping techniques results in a portion of available system resources to remain unutilized. Accordingly, it would be desirable to implement resource management techniques for a wireless communication system that enable more complete and efficient use of available system resources.

SUMMARY

The following presents a simplified summary of various aspects of the claimed subject matter in order to provide a basic understanding of such aspects. This summary is not an extensive overview of all contemplated aspects, and is intended to neither identify key or critical elements nor delineate the scope of such aspects. Its sole purpose is to present some concepts of the disclosed aspects in a simplified form as a prelude to the more detailed description that is presented later.

According to an aspect, a method for managing control resources in a wireless communication system is described herein. The method can comprise identifying a set of control channel groups and a corresponding set of control resources; grouping the set of control channel groups into N supergroups for a predetermined integer N; dividing the set of control resources into N non-overlapping subsets; and mapping the supergroups to respective subsets of the control resources such that control channel groups in the respective supergroups are multiplexed over the respectively corresponding subsets of the control resources.

Another aspect relates to a wireless communications apparatus, which can comprise a memory that stores data relating to a plurality of control indicator groups and a set of communication resources. The wireless communications apparatus can further comprise a processor configured to group respective control indicator groups into a first control indicator group set and a second control indicator group set, to divide the set of communication resources into first and second non-overlapping portions, to map the first control indicator group set to the first portion of the communication resources, and to map the second control indicator group set to the second portion of the communication resources.

A third aspect relates to an apparatus that facilitates control resource management in a wireless communication system. The apparatus can comprise means for forming respective supergroups from a plurality of indicator groups; means for associating the supergroups with respective non-overlapping sets of resource elements; and means for transmitting the supergroups using the sets of resource elements to which the supergroups are respectively associated.

A fourth aspect relates to a computer program product, which can comprise a computer-readable medium that comprises code for forming a set of even-indexed Physical Hybrid Automatic Repeat Request Indicator Channel (PHICH) groups and a set of odd-indexed PHICH groups; code for mapping the set of even-indexed PHICH groups to a first set of resource elements; and code for mapping the set of odd-indexed PHICH groups to a second, non-overlapping set of resource elements.

A fifth aspect relates to a method used in a wireless communication system. The method can comprise identifying a set of PHICH groups; mapping the set of PHICH groups to a set of symbols, wherein even PHICH groups are assigned nonzero values in a first set of symbol positions and zero values in a second set of symbol positions and odd PHICH groups are assigned zero values in the first set of symbol positions and nonzero values in the second set of symbol positions; performing layer mapping and precoding on the set of symbols to obtain a block of vectors representing signals for respective available antenna ports; summing symbol sequences corresponding to PHICHs in respective PHICH groups to obtain respective resulting summed sequences corresponding to the PHICH groups; and mapping respective sets of two adjacent PHICH groups to a common resource mapping unit at least in part by combining the summed sequences corresponding to the respective PHICH groups.

According to another aspect, a method for identifying resources associated with a control transmission is described herein. The method can comprise receiving a transmission from a base station that spans an identified set of control resources; identifying a first subset of the control resources and a second, non-overlapping subset of the control resources; identifying a control channel within the transmission to be decoded; determining a subset of the control resources associated with the control channel to be decoded from the first subset of the control resources or the second subset of the control resources; and decoding the control channel from the identified subset of the control resources.

Yet another aspect described herein relates to a wireless communications apparatus, which can comprise a memory that stores data relating to a set of communication resources, an indicator channel associated with the wireless communications apparatus, and a transmission received over the set of communication resources. The wireless communications apparatus can further comprise a processor configured to identify a first subset of the communication resources associated with a first indicator channel supergroup and a second, non-overlapping subset of the communication resources associated with a second indicator channel supergroup, to identify an indicator channel supergroup associated with the indicator channel associated with the wireless communications apparatus, and to decode the indicator channel associated with the wireless communications apparatus from the transmission from the identified subset of the communication resources.

Still another aspect relates to an apparatus that facilitates decoding a control transmission. The apparatus can comprise means for receiving a control transmission; means for identifying respective non-overlapping sets of resources corresponding to the control transmission; and means for decoding control information corresponding to one or more indicator groups, wherein the indicator groups are encoded within the control transmission using the respectively identified sets of resources.

A further aspect relates to a computer program product, which can comprise a computer-readable medium that comprises code for receiving a transmission over a known set of control resources; code for identifying a first portion of the control resources associated with a first PHICH supergroup; code for identifying a second portion of the control resources associated with a second PHICH supergroup, wherein the first portion and the second portion are substantially non-overlapping; code for determining one or more PHICHs to be decoded from at least one of the first PHICH supergroup and the second PHICH supergroup; and code for decoding the one or more determined PHICHs using respective portions of the control resources associated with PHICH supergroups in which the determined PHICHs are included.

An additional aspect described herein relates to an integrated circuit that executes computer-executable instructions for identifying and decoding PHICH information. The instructions can comprise identifying one or more PHICHs to be decoded and respective PHICH groups in which the one or more PHICHs are contained; identifying a resource element group (REG) apportioning, the REG apportioning comprising a first REG portion associated with odd-indexed PHICH groups and a second REG portion associated with even-indexed PHICH groups; receiving a control transmission using a set of resources comprising one or more REGs; and performing at least one of decoding an identified PHICH contained within an odd-indexed PHICH group from resources in the first REG portion or decoding an identified PHICH contained within an even-indexed PHICH group from resources in the second REG portion.

To the accomplishment of the foregoing and related ends, one or more aspects of the claimed subject matter comprise the features hereinafter fully described and particularly pointed out in the claims. The following description and the annexed drawings set forth in detail certain illustrative aspects of the claimed subject matter. These aspects are indicative, however, of but a few of the various ways in which the principles of the claimed subject matter can be employed. Further, the disclosed aspects are intended to include all such aspects and their equivalents.

DETAILED DESCRIPTION

Figure 1:
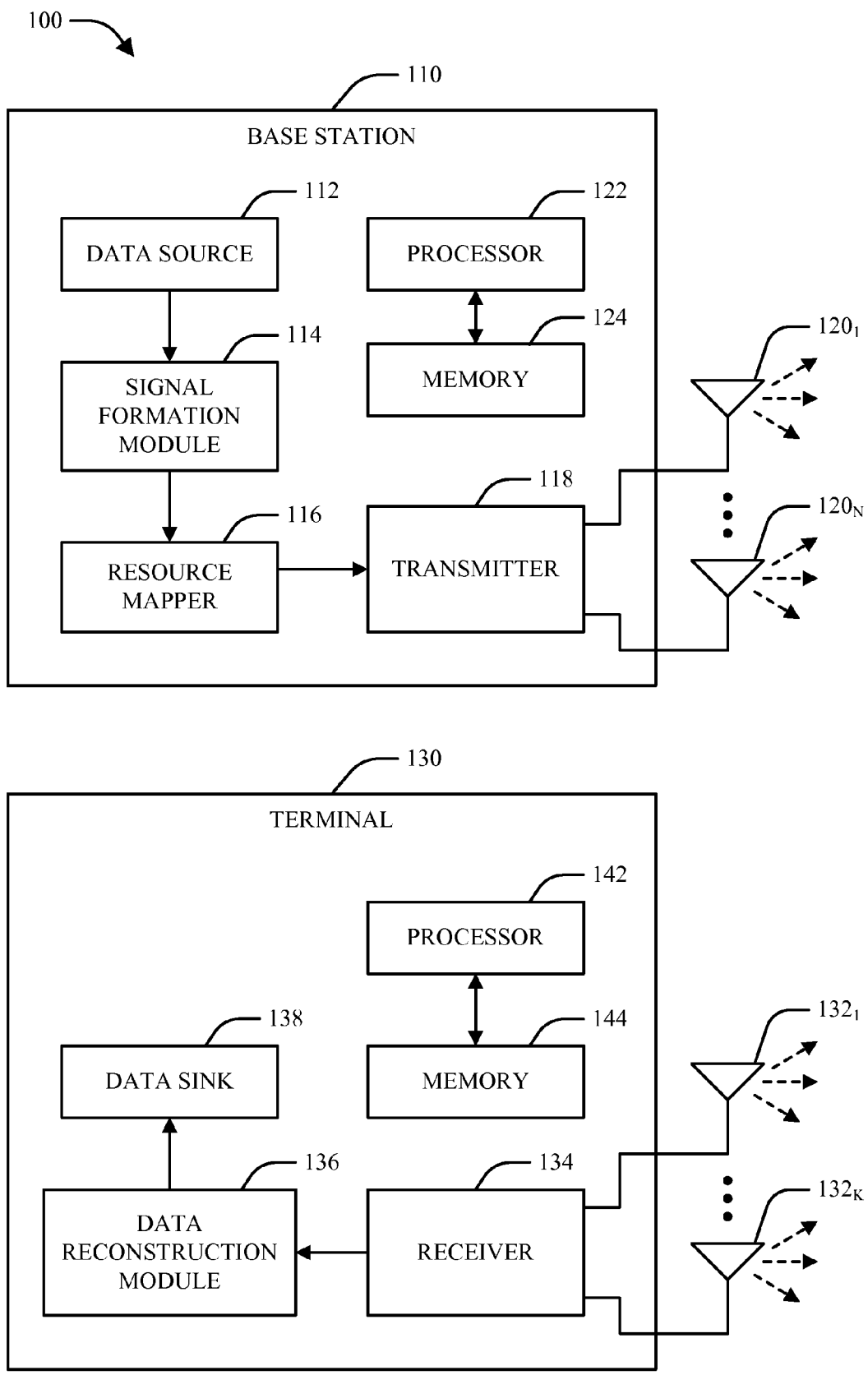
FIG. 1 is a block diagram of a system for conducting a control transmission within a wireless communication system in accordance with various aspects.

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment (UE). A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point or Node B) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, various functions described herein can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Various techniques described herein can be used for various wireless communication systems, such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Single Carrier FDMA (SC-FDMA) systems, and other such systems. The terms "system" and "network" are often used herein interchangeably. A CDMA system can implement a radio technology such as Universal Terrestrial Radio Access (UTRA), CDMA2000, etc. UTRA includes Wideband-CDMA (W-CDMA) and other variants of CDMA. Additionally, CDMA2000 covers the IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMR, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Further, CDMA2000 and UMB are described in documents from an organization named "3rd Generation Partnership Project 2" (3GPP2).

Various aspects will be presented in terms of systems that can include a number of devices, components, modules, and the like. It is to be understood and appreciated that the various systems can include additional devices, components, modules, etc. and/or can not include all of the devices, components, modules etc. discussed in connection with the figures. A combination of these approaches can also be used.

Referring now to the drawings, FIG. 1 illustrates conducting a control transmission within a wireless communication system in accordance with various aspects described herein. As FIG. 1 illustrates, system 100 can include a base station 110 and a terminal 130, which can communicate with each other via respective antennas 120 and 132. Although only one base station 110 and one terminal 130 are illustrated in system 100, it should be appreciated that system 100 can include any number of base stations 110 and/or antennas 130. In one example, base station 110 can transmit data, control signaling, and/or other suitable information on the downlink (DL, also referred to herein as the forward link (FL)) to terminal 130. Additionally or alternatively, terminal 130 can conduct one or more uplink (UL, also referred to herein as reverse link (RL)) transmissions to base station 110.

In accordance with one aspect, base station 110 can generate and/or otherwise obtain information to be transmitted in a DL communication to terminal 130 from a data source 112. Such information can include, for example, application data, control signaling, or the like. Application data can relate to any suitable application(s), such as voice applications, video applications, packet data applications, and/or any other suitable type of application. Control signaling can be utilized to regulate the operation of terminal 130 and/or other network entities and can include, for example, power control information, resource assignment information, acknowledgement/negative acknowledgement (ACK/NACK) information, and/or any other suitable information.

In one example, based on information associated with data source 112, a signal can be constructed for transmission of the information using a signal formation module 114. Signal formation module 114 can perform, for example, scrambling, modulation, preceeding, and/or one or more other appropriate operations to generate a signal corresponding to information designated for transmission. Subsequently, upon generation of a signal, a resource mapper 116 can be utilized to map the generated signal to communication resources utilized by base station 110. Specific, non-limiting examples of techniques that can be utilized by signal formation module 114 and/or resource mapper 116 are described in more detail infra.

In another example, after a signal has been generated by signal formation module 114 and mapped to appropriate resources by resource mapper 116, the signal can be provided to a transmitter 118 to facilitate transmission of the signal via antenna(s) 120. In accordance with one aspect, once a signal has been transmitted, it can be received at terminal 130 by a receiver 134 via antenna(s) 132. The received signal at terminal 130 can then be processed by a data reconstruction module 136, which can perform reverse resource mapping, demodulation, decoding, and/or one or more other appropriate operations to obtain transmitted information associated with the signal. In one example, information obtained by data reconstruction module 136 can subsequently be provided to a data sink 138 for storage and/or further processing.

In accordance with one aspect, base station 110 can utilize a processor 122 and/or memory 124 to implement some or all of the above-described functionality of base station 110 and/or its subcomponents. Additionally and/or alternatively, terminal 130 can utilize a processor 142 and/or memory 144 to implement some or all of the above-described functionality of terminal 130. Further, it should be appreciated that while the above description relates to a communication from base station 110 to terminal 130, similar components and/or techniques could be utilized within system 100 for a communication from terminal 130 to base station 110.

Figure 2:
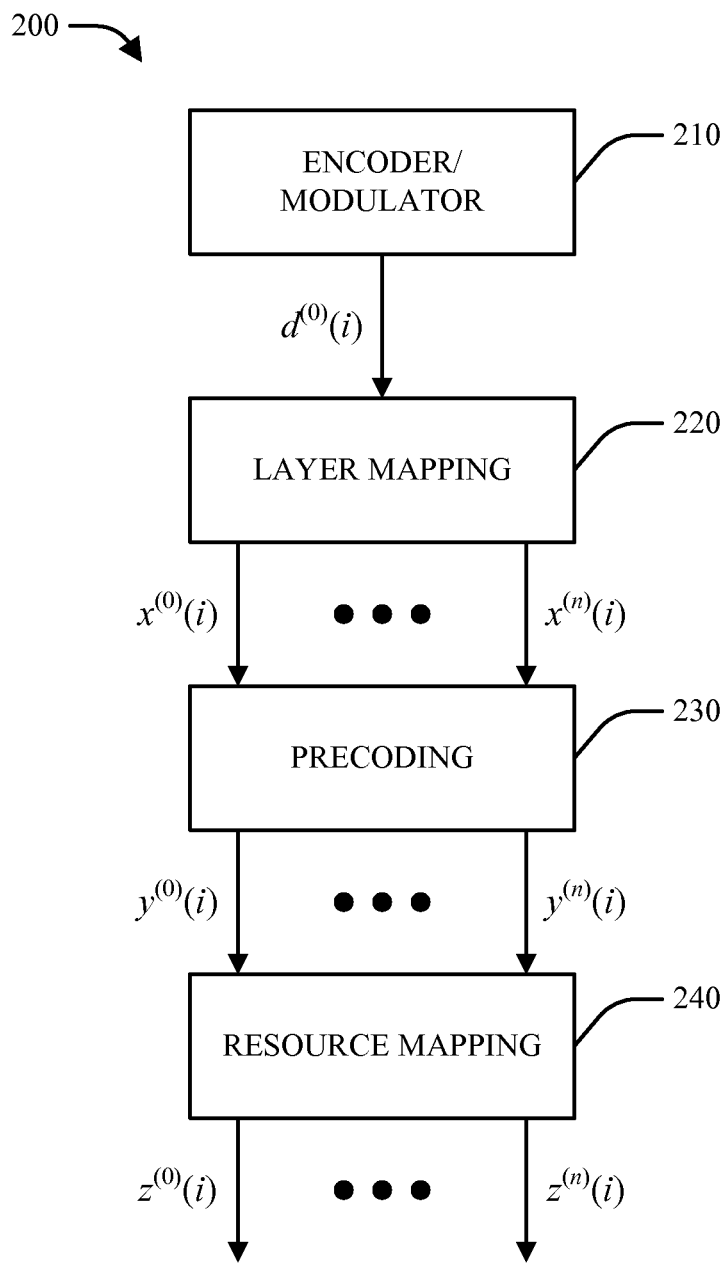
FIG. 2 is a block diagram of a system for constructing a control transmission in accordance with various aspects.

In accordance with another aspect, construction of a signal for transmission from base station 110 to terminal 130 can be performed (e.g., by signal formation module 114) as shown by system 200 in FIG. 2. In one example, information to be transmitted can be initially processed by an encoder/modulator 210, which can perform operations such as encoding for respective information bits, scrambling for respective coded bits, modulation, and/or other suitable operations to create a set of modulation symbols $d^{(0)}(i)$ corresponding to a codeword to be transmitted. While system 200 illustrates a single codeword and a single corresponding set $d^{(0)}(i)$ of modulation symbols, it should be appreciated that any number of codewords and/or corresponding sets of modulation symbols could be used.

Next, the set $d^{(0)}(i)$ of modulation symbols can be provided to a layer mapping block 220, which can distribute consecutive modulation symbols onto n separate transmission layers to generate outputs $x^{(0)}(i)$ corresponding to the respective layers. In one example, the layer mapping outputs are provided to a precoding block 230, which can perform space-frequency encoding and/or any other suitable technique to generate preceeding outputs $y^{(0)}(i)$ corresponding to n respective transmit antennas. Finally, the precoding outputs $y^{(0)}(i)$ can be mapped to REs associated with the n transmit antennas via a resource mapping block 240. As illustrated by system 200, following the processing by resource mapping block 240, a set of n output signals $z^{(0)}(i)$ can be generated, which in turn can be transmitted by n corresponding transmit antennas (e.g., via a transmitter 118).

Returning now to FIG. 1, control information that can be transmitted between base station 110 and terminal 130 can include a Physical Hybrid ARQ (Automatic Repeat Request) Indicator Channel (PHICH), which can be utilized to carry hybrid-ARQ ACK/NACK indicator(s) on the downlink from base station 110 to terminal 130. In one example, multiple PHICHs can be mapped to a common resource element group (REG) to form a PHICH group.

Within a PHICH group, individual PHICHs can be separated through the use of respective orthogonal sequences and/or in any other suitable manner. Thus, code division multiplexing (CDM) can be utilized to transmit PHICHs corresponding to multiple users over a common REG. For example, in the case of a normal cyclic prefix (CP), a spreading factor of four can be utilized. This can enable the transmission of one bit by multiplying the one bit by a spreading code to obtain four symbols, which can be mapped to four respective REs in a four-element REG. Thus, it can be appreciated that, by allowing other users to modulate signals using orthogonal codes having a spreading factor of four over the same four REs, a REG with 4 REs can be utilized to accommodate 4 users. Further, it can be appreciated that by using both an in-phase (I) branch and a quadrature (Q) branch, 8 users can be accommodated on a REG with 4 REs, or alternatively 4 users transmitting 2-bit ACK/NACK information can be accommodated.

Figure 3:
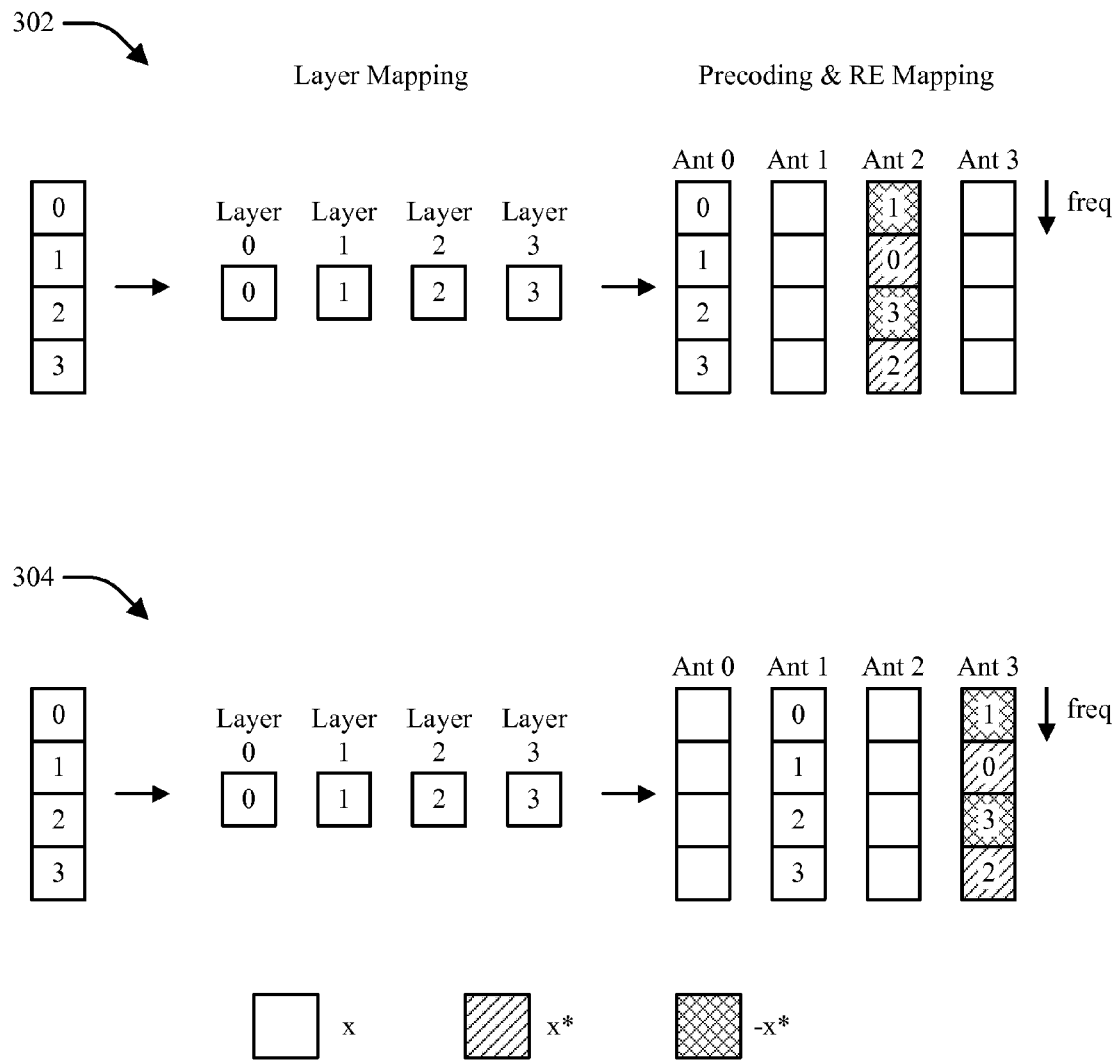
FIGS. 3-4 illustrate example layer mapping and precoding techniques that can be utilized for a control transmission.

The above example is illustrated for a system having 4 transmit (Tx) antennas by diagrams 302-304 in FIG. 3. In one example, a PHICH group can include 12 symbols and can be transmitted over three quadruplets. Accordingly, as diagrams 302 and 304 illustrate, respective PHICHs in a PHICH quadruplet can be mapped to four layers respectively associated with four Tx antennas. Subsequently, precoding and RE mapping for a PHICH quadruplet can be accomplished using two space-frequency block codes (SFBCs) on two antennas at a time. As diagrams 302 and 304 further illustrate, an antenna mapping can be configured to change with time in order to make use of all four Tx antennas. For example, the antennas utilized for transmission of a PHICH quadruplet can vary as a function of an index of the PHICH group containing the quadruplet and/or the position of the quadruplet within the PHICH group.

Alternatively, in the case of an extended CP, a spreading factor of two may be utilized such that mapping a PHICH quadruplet to a set of four layers as illustrated in FIG. 3 is not practicable. Thus, in the extended CP case, PHICHs can be processed as shown by diagrams 402 and 404 in FIG. 4. More particularly, as diagrams 402-404 illustrate, PHICHs corresponding to even PHICH groups can be mapped to layers 0 and 1 and PHICHs corresponding to odd PHICH groups can be mapped to layers 2 and 3. Subsequently, precoding and RE mapping can be carried out in a manner similar to that described above with regard to diagrams 302 and 304 in FIG. 3.

Figure 4:
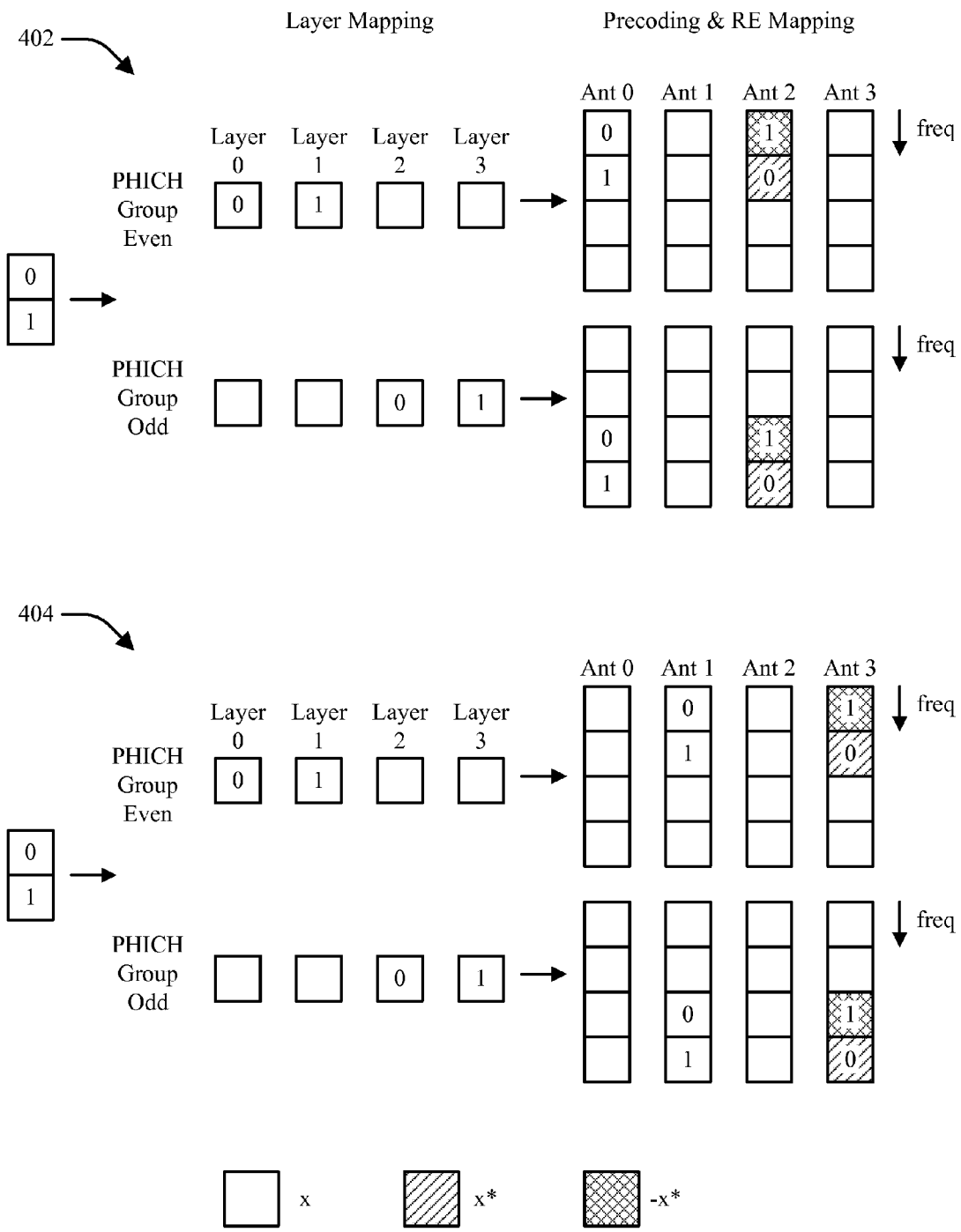

Thus, as can be observed from FIGS. 3-4, a PHICH layer mapping can be adjusted in the case of four Tx antennas to ensure complete usage of transmission resources. However, if a smaller number of Tx antennas (e.g., 1 or 2) is used, it can be appreciated that layer mapping alone is not sufficient to ensure the most optimal use of system resources due to the fact that usage of a smaller number of Tx antennas would also require the use of a smaller number of layers.

For example, in the case of a system with two Tx antennas wherein an extended CP is utilized, layer mapping for PHICH can be performed as follows:

$$x^{(0)}(i)=d^{(0)}(2i).$$

$$x^{(1)}(i)=d^{(0)}(2i+1)$$

Further, precoding can be performed as follows:

$$y^{(0)}(2i)=x^{(0)}(i)$$

$$y^{(0)}(2i+1)=x^{(1)}(i))^*,$$

$$y^{(1)}(2i)=-(x^{(1)}(i))^*,$$

$$y^{(1)}(2i+1)=(x^{(0)}(i)^*$$

where $(\cdot)^*$ denotes the complex conjugate. However, it can be appreciated that it is unclear from conventional techniques how to map sequences corresponding to respective PHICH groups to resource elements in such a system. In particular, in the normal CP case a spreading factor of four is utilized, which allows PHICHs corresponding to four users to be mapped to a REG of four REs in size. However, for the extended CP case, it cannot be assumed that the channel is the same across the four REs in a REG due to a smaller channel coherent bandwidth associated with the extended CP case. Thus, the spreading factor for the extended CP case is changed from four to two, and CDM is applied for two users across the four-element REG. As described below, this can result in some resources remaining unused.

In a conventional wireless communication system, the sequence $\bar{y}^{(p)}(0), \ldots, \bar{y}^{(p)}(M_{symb}-1)$ for respective PHICH groups is defined by the following:

$$\bar{y}^{(p)}(n)=\Sigma y_i^{(p)}(n),$$

where the summation is performed over all PHICHs in a PHICH group and the term $y_i^{(p)}(n)$ represents the symbol sequence corresponding to the i-th PHICH in the PHICH group. Subsequently, resource mapping is performed as follows:

$$z^{(p)}(i)=\langle y^{(p)}(4i), y^{(p)}(4i+1), y^{(p)}(4i+2), y^{(p)}(4i+3)\rangle \text{ for } i=0,1,2$$

where $z^{(p)}(i)$ represents an i-th symbol quadruplet for antenna port p.

However, by using the conventional PHICH processing techniques described above, it can be observed that two repetitions of one PHICH group will lie in the same mini-control channel element (CCE) corresponding to i=0, while the half of the mini-CCE location corresponding to i=1, as well as the mini-CCE corresponding to i=2, will be unutilized.

Figure 5:
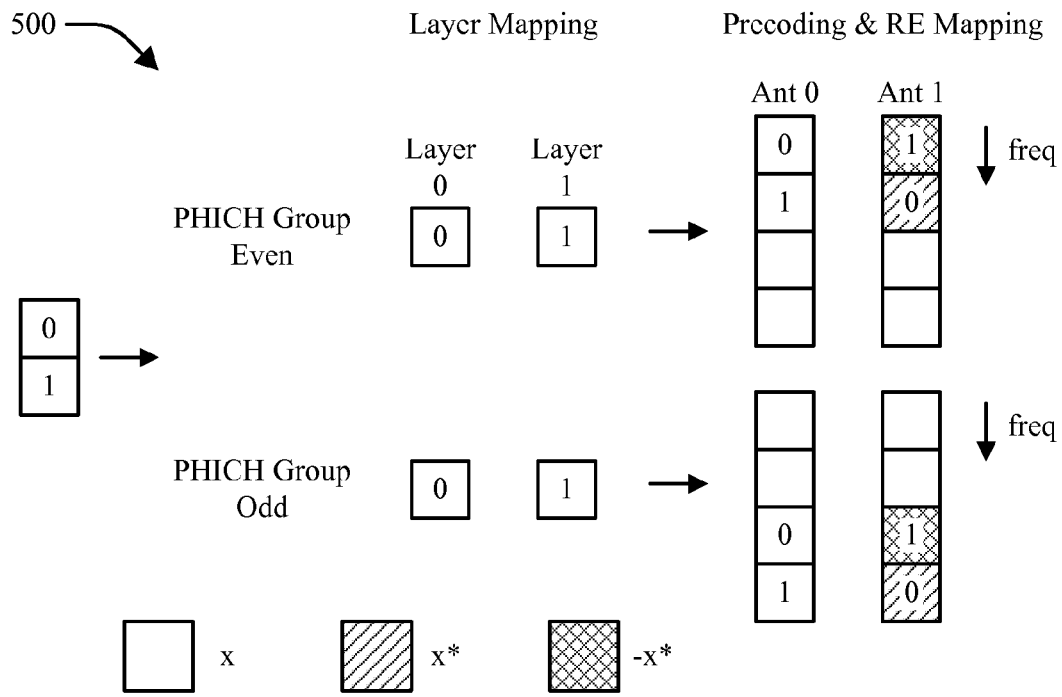
FIGS. 5-6 illustrate example layer mapping and precoding techniques that can be utilized for a control transmission in accordance with various aspects.

Thus, in accordance with one aspect, signal formation module 114 can overcome the above noted deficiencies for the extended CP case by forming PHICH supergroups from sets of PHICH groups and mapping respective PHICH supergroups into different portions of an available REG, thereby enabling all elements of a REG to be used. For example, in the case of an extended CP structure with an associated spreading factor of two, respective PHICH groups can be configured to include two users each. PHICH supergroups of two PHICH groups each can then be formed, such that a first PHICH supergroup uses a first subset of an REG and a second PHICH supergroup uses a second, non-overlapping subset of the REG. One example implementation of this technique is illustrated for the two Tx antenna case by diagram 500 in FIG. 5. As diagram 500 illustrates, a set of four PHICH groups can be grouped into two PHICH supergroups, such that each supergroup is mapped to the available two layers corresponding to the two Tx antennas. Next, diagram 500 illustrates that precoding and RE mapping can be performed differently for each PHICH supergroup such that PHICHs corresponding to one supergroup are mapped to a first set of frequency resources associated with the Tx antennas and the PHICHs corresponding to the other supergroup are mapped to the remaining frequency resources. By doing so, it can be appreciated that a resource mapping for PHICH can be achieved without incurring the wasted resources associated with traditional mapping techniques.

As diagram 500 illustrates, PHICH supergroups can be formed by placing odd-indexed PHICH groups into an odd supergroup and placing even-indexed PHICH groups into an even supergroup. However, it should be appreciated that any other grouping of PHICH groups into supergroups could be utilized. For example, given a set of four PHICH groups, the first and second groups could be placed into a first supergroup while the third and fourth groups could be placed into a second supergroup. Additionally or alternatively, any other grouping could be utilized. In addition, while diagram 500 illustrates that a first PHICH supergroup can utilize the first two elements of an REG and that a second PHICH supergroup can utilize the remaining two elements, it should be appreciated that PHICH supergroups could be mapped to non-overlapping sets of resource elements in a REG in any suitable manner. Further, it is to be appreciated that the techniques described herein could also be utilized for any number of PHICH groups and/or any applicable REG size.

By way of specific, non-limiting example, given a set of four PHICH groups, two PHICH groups can be grouped together to form a super-PHICH group, which can then be multiplexed over each mini-CCE as illustrated in diagram 500. In accordance with one aspect, the mapping illustrated by diagram 500 can be implemented in various manners. In a first example, the orthogonal sequences for PHICH can be modified according to Table 1 below, where $n_{PHICH}^{seq}$ denotes the index of a given PHICH within a corresponding PHICH group and $N_{SF}^{PHICH}$ denotes the PHICH group size:

TABLE 1

| Sequence Index $[[n_{PHICH}^{seq}]]$ | Orthogonal sequences $[w(0) \ldots w(N_{SF}^{PHICH}-1)]$ for PHICH, extended CP. | |
|---|---|---|
| $n_{PHICH}^{seq}$ | Odd PHICH Group | Even PHICH Group |
| 0 | [+1 +1 0 0] | [0 0 +1 +1] |
| 1 | [+1 −1 0 0] | [0 0 +1 −1] |
| 2 | [+j +j 0 0] | [0 0 +j +j] |
| 3 | [+j −j 0 0] | [0 0 +j −j] |

As Table 1 illustrates, a SF2 spreading code conventionally associated with the extended CP case can be extended to SF4 by appending zeros to the SF2 spreading code at known positions in order to accommodate two PHICH supergroups on a common REG. In one example, $N_{SF}^{PHICH}$ as used in Table 1 above is equal to 4 for both the normal and extended CP cases. In addition, while Table 1 illustrates that zeros can be appended to the end of a spreading code associated with a supergroup formed of odd PHICH groups and to the beginning of a spreading code associated with a supergroup formed of even PHICH groups, it should be appreciated that zeros can be appended to any suitable non-overlapping positions within the codes respectively associated with the supergroups. Thus, it is to be appreciated that respective PHICH supergroups can be mapped on any suitable non-overlapping subset of subcarriers in a mini-CCE. Further, it should be appreciated that supergroup creation can be performed in any suitable manner and that it is not required for the respective supergroups to be formed from even PHICH groups and odd PHICH groups.

In a second example, a resource mapping for PHICH can be modified in the following manner. First, for a transmission on two Tx antennas ports in the extended CP case, the sequence $\bar{y}_e^{(p)}(0), \ldots, \bar{y}_e^{(p)}(M_{symb}-1)$ for respective even PHICH groups can be defined by the following:

$$\bar{y}_e^{(p)}(n)=\Sigma y_{e,i}^{(p)}(n) \text{ if } n_{PHICH}^{group} \text{ mod } 2=0,$$

where the summation is performed over all PHICHs in an applicable PHICH group and $y_{e,i}^{(p)}(n)$ represents the symbol sequence from the i-th PHICH in the PHICH group. Similarly, the sequence $\bar{y}_o^{(p)}(0), \ldots, \bar{y}_o^{(p)}(M_{symb}-1)$ for respective odd PHICH groups can be defined by the following:

$$\bar{y}_o^{(p)}(n)=\Sigma y_{o,i}^{(p)}(n) \text{ if } n_{PHICH}^{group} \text{ mod } 2=1,$$

where the summation is performed over all PHICHs in an applicable PHICH group and $y_{o,i}^{(p)}(n)$ represents the symbol sequence from the i-th PHICH in the PHICH group.

Based on the above definitions, an i-th symbol quadruplet for an antenna port p can be defined as follows:

$$z^{(p)}(i) = \{y^{(p)}(4i), y^{(p)}(4i+1), y^{(p)}(4i+2), y^{(p)}(4i+3)\}, i=0, 1, 2,$$

where $y^{(p)}(4i) = y_e^p(2i)$, $y^{(p)}(4i+1) = y_e^p(2i+1)$, $y^{(p)}(4i+2) = y_o^p(2i)$, and $y^{(p)}(4i+3) = y_o^p(2i+1)$. It should be appreciated, however, that this mapping is merely an example of a mapping that can be utilized to map two PHICH groups on a common mini-CCE. For example, while the above mapping utilizes even and odd PHICH supergroups, it should be appreciated that supergroups can be formed in any suitable manner. Further, it should be appreciated that supergroups can be mapped to any appropriate subsets of sub-carriers within a REG. In accordance with one aspect, layer mapping and/or precoding can be performed as generally known in the art in connection with one or more of the resource management techniques described herein and/or any other suitable resource management technique.

Figure 6:
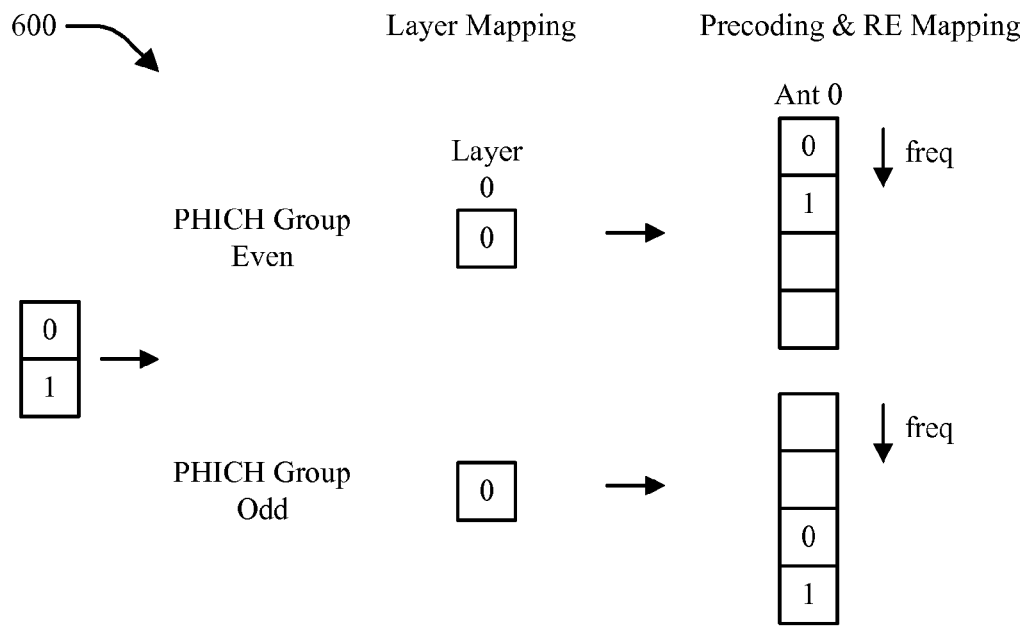

In accordance with another aspect, similar resource management techniques to those utilized above for a system with two Tx antennas and an extended CP structure can be employed in the case of a system with one Tx antenna. In such an example, layer mapping for PHICH can be performed by $x^{(0)}(i) = d^{(0)}(i)$, while precoding can be performed using $y^{(0)}(i) = x^{(0)}(i)$. Thus, resource management for respective PHICH groups in the one Tx antenna case can be carried out by dividing the PHICH groups into supergroups and mapping the respective supergroups to non-overlapping elements of an associated REG using one or more of the techniques described above (e.g., orthogonal sequence modification and/or resource mapping modification) and/or any other suitable technique. An example of the results of such a technique for a set of four PHICH groups and one Tx antenna is illustrated by diagram 600 in FIG. 6. While FIG. 6 illustrates an example in which even and odd supergroups have been formed, it should be appreciated that PHICH groups can be formed into supergroups in any suitable manner. Further, while the even supergroup is illustrated as occupying the first two elements of the associated REG and the odd supergroup is illustrated as occupying the last two elements, it should be appreciated that resources can be distributed among PHICH supergroups in any appropriate manner.

Referring now to FIGS. 7-11, methodologies that can be performed in accordance with various aspects set forth herein are illustrated. While, for purposes of simplicity of explanation, the methodologies are shown and described as a series of acts, it is to be understood and appreciated that the methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Figure 7:
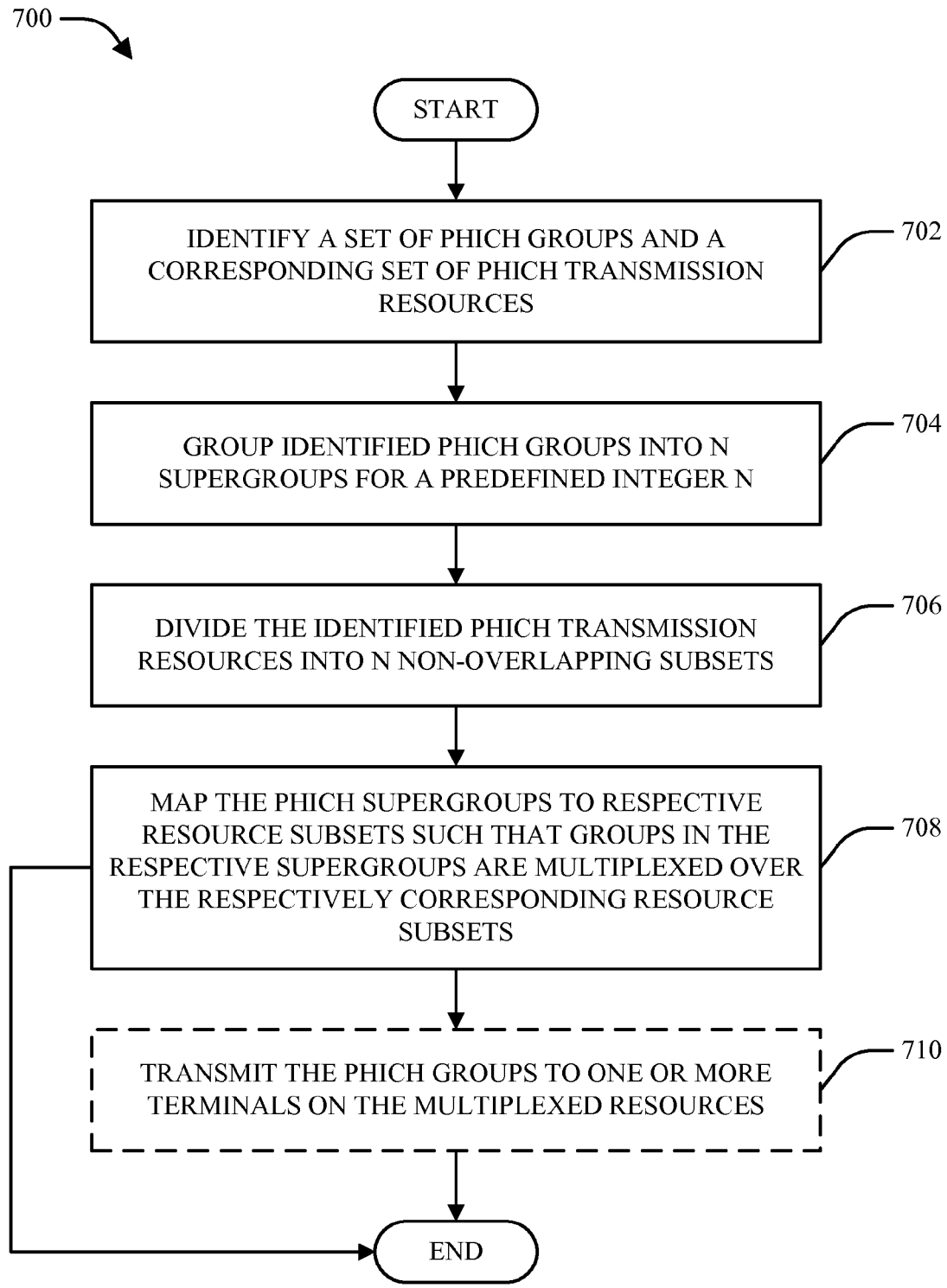
FIGS. 7-9 are flow diagrams of respective methodologies for managing resources associated with a PHICH transmission.

With reference to FIG. 7, illustrated is a methodology 700 for managing resources associated with a PHICH transmission. It is to be appreciated that methodology 700 can be performed by, for example, a base station (e.g., base station 110) and/or any other appropriate network device. Methodology 700 begins at block 702, wherein a set of PHICH groups and a corresponding set of PHICH transmission resources are identified. Next, at block 704, PHICH groups identified at block 702 are grouped into N (e.g., 2) supergroups for a predefined integer N. At block 706, the PHICH resources identified at block 702 are divided into N non-overlapping subsets. At block 708, the PHICH supergroups formed at block 704 are then mapped to respective resource subsets created at block 706 such that groups in the respective PHICH supergroups are multiplexed over the respectively corresponding resource subsets. Upon completing the acts described at block 708, methodology 700 can conclude or can optionally proceed to block 710 prior to concluding, wherein the PHICH groups are transmitted to one or more terminals on the resources on which the PHICH groups were multiplexed at block 708.

Figure 8:
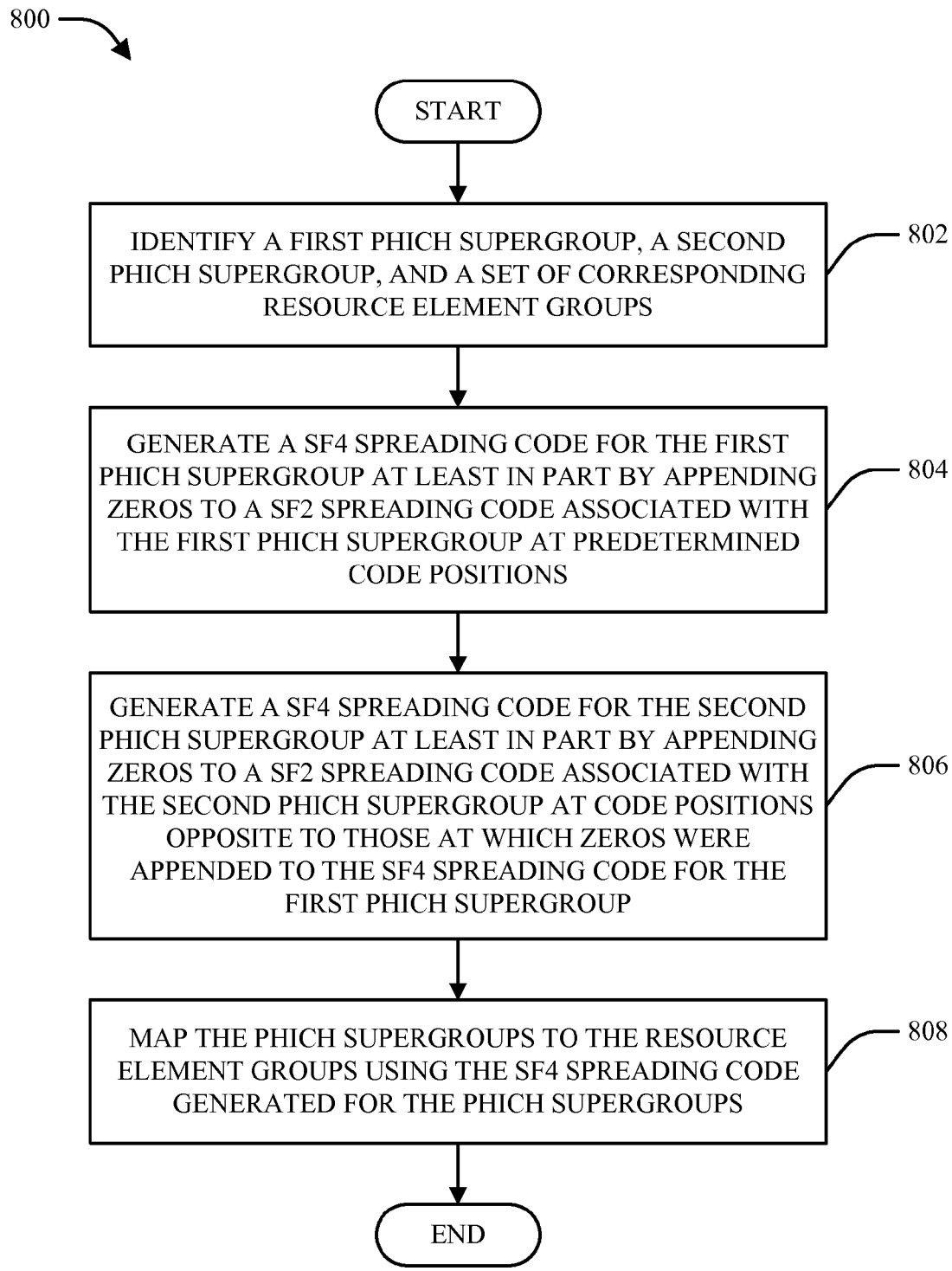

Turning to FIG. 8, an additional methodology 800 for managing resources associated with a PHICH transmission is illustrated. Methodology 800 can be performed by, for example, a Node B and/or any other appropriate device. Methodology 800 begins at block 802, wherein a first PHICH supergroup, a second PHICH supergroup, and a set of corresponding REGs are identified. While methodology 800 describes a series of operations for a set of two PHICH supergroups, it should be appreciated that operations similar to those described by methodology 800 could be utilized for any number of supergroups. Further, it should be appreciated that supergroups can be formed in any appropriate manner (e.g., as even and odd supergroups as described above).

Next, at block 804, a SF4 spreading code is created for the first PHICH supergroup identified at block 802 at least in part by appending zeros to a SF2 spreading code associated with the first PHICH supergroup at predetermined code positions. At block 806, a SF4 spreading code is created for the second PHICH supergroup identified at block 802 at least in part by appending zeros to a SF2 spreading code associated with the second PHICH supergroup at code positions opposite to those at which zeros were appended to the code for the first PHICH supergroup at block 804. Thus, in one example, zeros can be appended at the first and second code positions at block 804 and at the third and fourth code positions at block 806. Methodology 800 can then conclude at block 808, wherein the PHICH supergroups are mapped to the REGs identified at block 802 using the SF4 spreading code generated for the PHICH supergroups at blocks 804 and 806.

Figure 9:
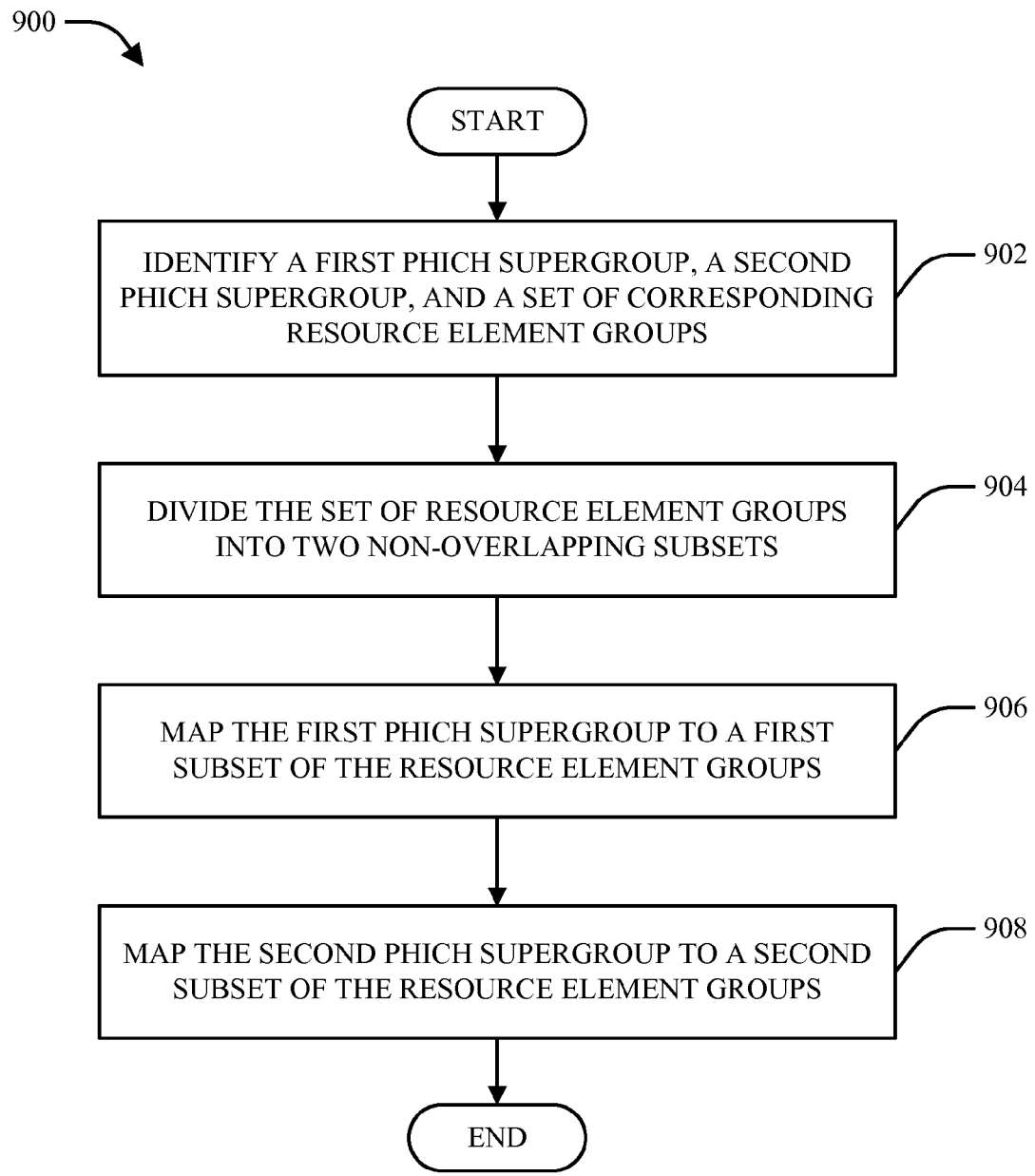

FIG. 9 illustrates a further methodology 900 for managing resources associated with a PHICH transmission. Methodology 900 can be performed by, for example, a base station and/or any other suitable network device. Methodology 900 begins at block 902, wherein a first PHICH supergroup, a second PHICH supergroup, and a set of corresponding REGs are identified. While methodology 900 describes a series of operations for a set of two PHICH supergroups, it should be appreciated that operations similar to those described by methodology 900 could be utilized for any number of supergroups. Further, it should be appreciated that supergroups can be formed in any appropriate manner (e.g., as even and odd supergroups as described above).

Next, methodology 900 can proceed to block 904, wherein the set of REGs identified at block 902 is divided into two non-overlapping subsets. Methodology 900 can then conclude by performing the acts described at block 906, wherein the first PHICH supergroup is mapped to a first subset of the REGs formed at block 904, and at block 908, wherein the second PHICH supergroup is mapped to a second subset of the REGs formed at block 904.

Figure 10:
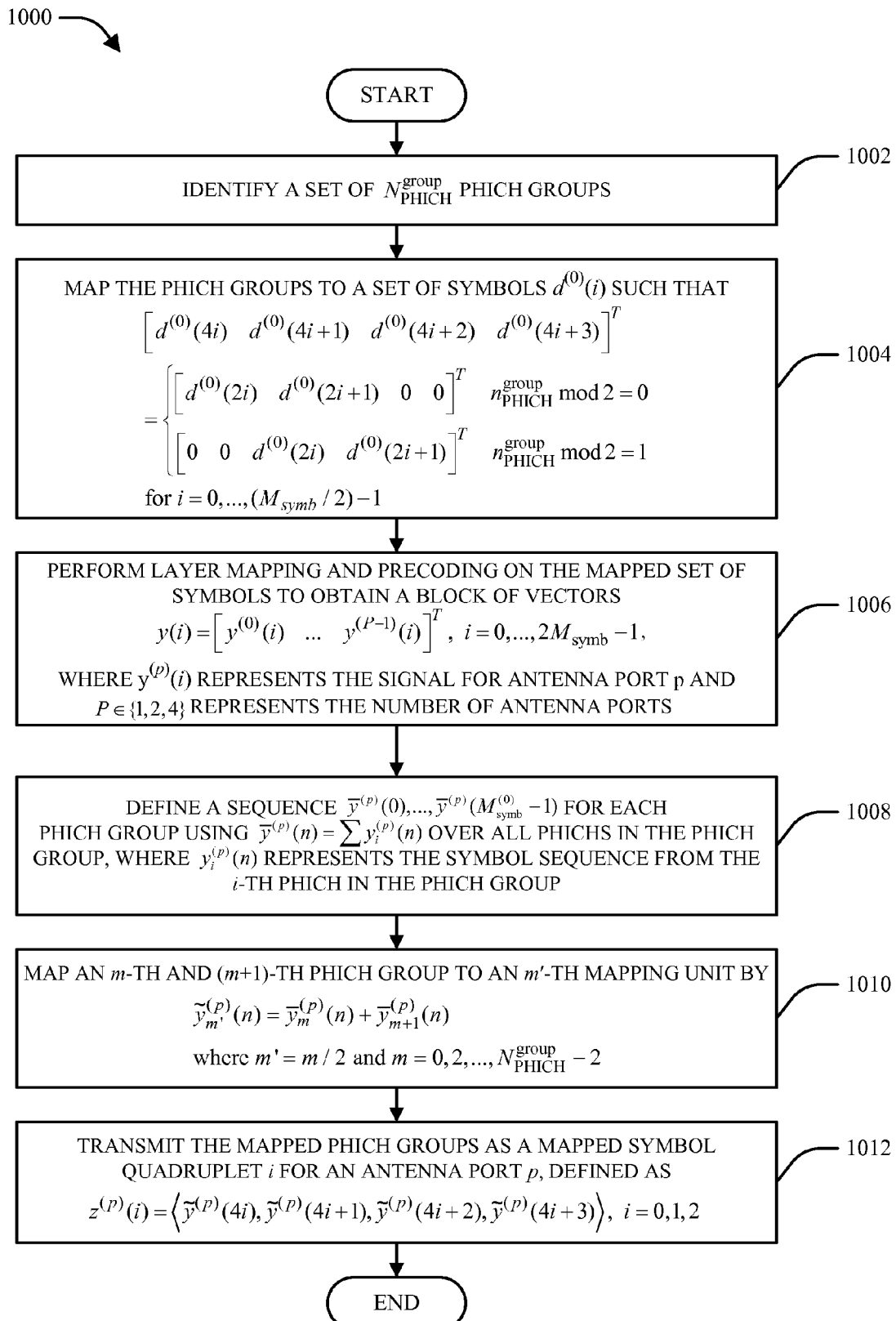
FIG. 10 is a flow diagram of a methodology for performing resource group alignment and resource element mapping for a PHICH transmission.

Referring next to FIG. 10, a methodology 1000 for performing resource group alignment and resource element mapping for a PHICH transmission is illustrated. Methodology 1000 begins at block 1002, wherein a set of $N_{PHICH}^{group}$ PHICH groups is identified. Next, at block 1004, even PHICH groups are distinguished from odd PHICH groups, thereby effectively creating even and odd PHICH supergroups. More particularly, the PHICH groups identified at block 1002 are mapped to a set of symbols $d^{(0)}(i)$ such that:

$$\begin{bmatrix} d^{(0)}(4i)d^{(0)}(4i+1) \\ d^{(0)}(4i+2)d^{(0)}(4i+3) \end{bmatrix}^T =$$

$$\begin{cases} [d^{(0)}(2i) \ d^{(0)}(2i+1) \ 0 \ 0]^T n_{PHICH}^{group} \bmod 2 = 0 \\ [0 \ 0 \ d^{(0)}(2i) \ d^{(0)}(2i+1)]^T n_{PHICH}^{group} \bmod 2 = 1 \end{cases}$$

for $i = 0, \ldots, (M_{symb}/2) - 1$ where $M_{symb}$ is the number of symbols in the respective PHICH groups.

Upon completing the acts described at block 1004, methodology 1000 continues to block 1006, wherein layer mapping and preceding are performed on the set of symbols $d^{(0)}(i)$ mapped at block 1004 to obtain a block of vectors $y(i) = [y^{(0)}(i) \ldots y^{(P-1)}(i)]^T$, $i=0, \ldots, i=0, \ldots, 2M_{symb}-1$, where $y^{(p)}(i)$ represents the signal for antenna port p and $P\epsilon\{1,2,4\}$ represents the number of available antenna ports.

In accordance with one aspect, after the preceeding and layer mapping performed at block 1006, resource mapping can be performed as described at blocks 1008 and 1010. More particularly, at block 1008, a sequence $\bar{y}^{(p)}(0), \ldots, \bar{y}^{(p)}(M_{symb}^{(0)}-1)$ is defined for each PHICH group identified at block 1002 using the equation $\bar{y}^{(p)}(n) = \Sigma y_i^{(p)}(n)$ over all PHICHs in the respective PHICH groups, where $y_i^{(p)}(n)$ represents the symbol sequence from the i-th PHICH in a given PHICH group. Next, at block 1010, an m-th PHICH group and an (m+1)-th PHICH group are mapped together into a common m'-th resource mapping unit as follows:

$$\tilde{y}_{m'}^{(p)}(n) = \bar{y}_m^{(p)}(n) + \bar{y}_{m+1}^{(p)}(n)$$

where $m'=m/2$ and $m=0,2,\ldots,N_{PHICH}^{group}-2$.

In accordance with one aspect, resource mapping units as used at block 1010 can correspond to REs as used in various aspects described above. Further, it should be appreciated that as even PHICH groups and odd PHICH groups are grouped together according to their symbol mapping at block 1004, the resource mapping at 1010 can operate to place an even PHICH group and an adjacent odd PHICH group, or vice versa, into a common REG in a similar manner to that described above. Finally, at block 1012, the resource-mapped PHICH groups can be transmitted as a mapped symbol quadruplet i for an antenna port p, which can be defined as follows:

$$z^{(p)}(i) = <\tilde{y}^{(p)}(4i), \tilde{y}^{(p)}(4i+1), \tilde{y}^{(p)}(4i+2), \tilde{y}^{(p)}(4i+3)>, i=0,1,2.$$

Figure 11:
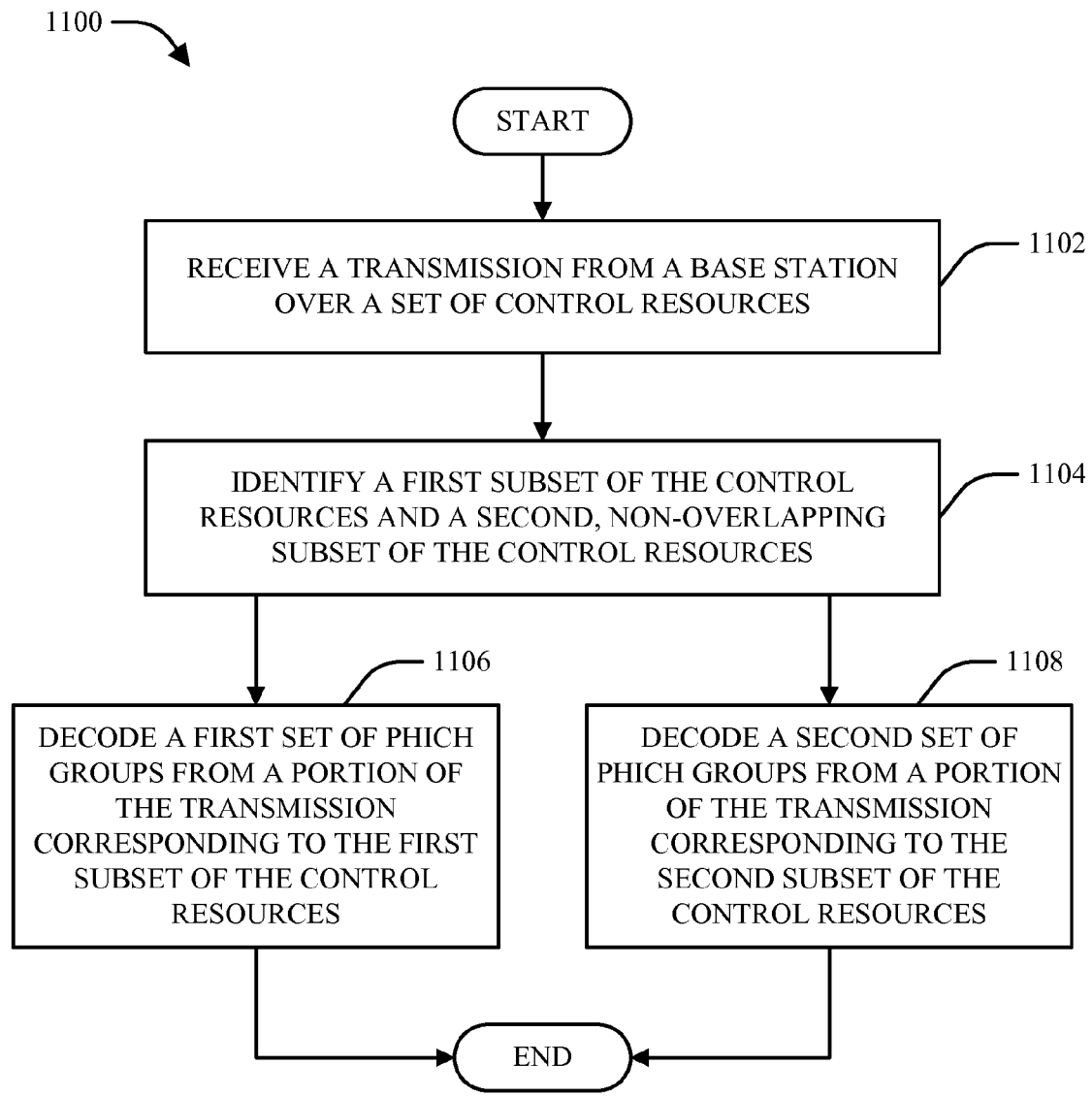
FIG. 11 is a flow diagram of a methodology for identifying and decoding elements of a received control transmission.

Turning to FIG. 11, illustrated is a methodology 1100 for identifying and decoding elements of a received control transmission. It is to be appreciated that methodology 1100 can be performed by, for example, a mobile terminal (e.g., terminal 130) and/or any other appropriate network device. Methodology 1100 begins at block 1102, wherein a transmission is received from a base station (e.g., base station 110) over a set of control resources. Next, at block 1104, a first subset of the control resources and a second, non-overlapping subset of the control resources are identified.

Upon completing the acts described at block 1104, methodology 1100 can proceed to block 1106, wherein a first set of PHICH groups is decoded from a portion of the transmission received at 1102 corresponding to the first subset of the control resources identified at block 1104, and/or to block 1108, wherein a second set of PHICH groups is decoded from a portion of the transmission received at 1102 corresponding to the second subset of the control resources identified at block 1104.

In accordance with one aspect, methodology 1100 can proceed to block 1106 and/or 1108 based on one or more sets of PHICH groups associated with an entity performing methodology 1100. Thus, for example, an entity performing methodology can identify an association with the first set of PHICH groups, the second set of PHICH groups, or both based on a preconfigured parameter, one or more previous communications from the base station from which the transmission at block 1102 was received and/or another network device, and/or in any other suitable manner. In accordance with another aspect, the first set of PHICH groups decoded at block 1106 and/or the second set of PHICH groups decoded at block 1108 can correspond to PHICH supergroups created by the base station from which the transmission is received at block 1102. It should be appreciated that, as generally described above, the sets of PHICH groups can be created in any suitable manner (e.g., as even/odd supergroups and/or in any other manner).

Figure 12:
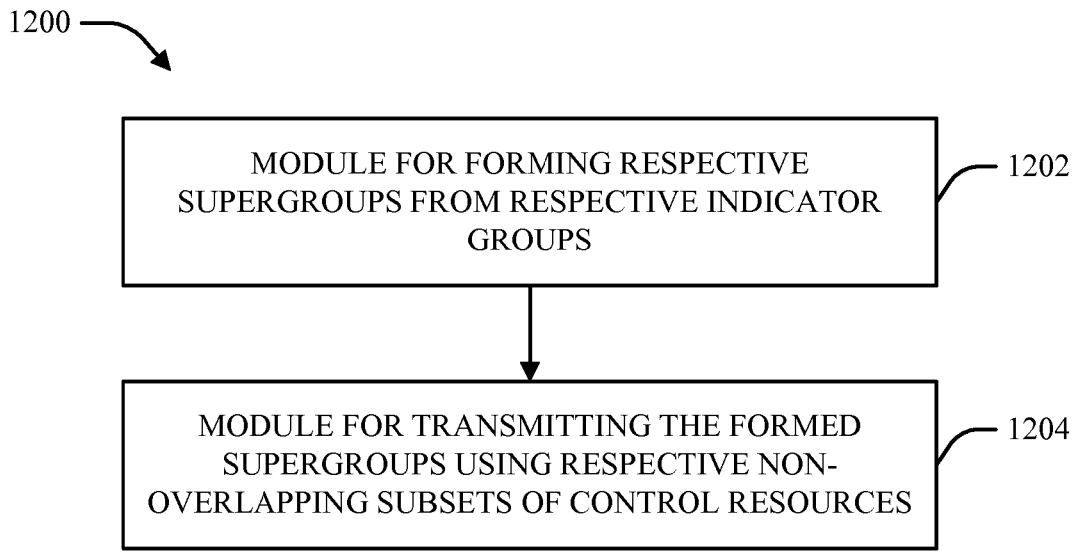
FIGS. 12-13 are block diagrams of respective apparatus that facilitate management of resources associated with a control transmission.

Moving to FIG. 12, an apparatus 1200 that facilitates management of resources associated with a control transmission is illustrated. It is to be appreciated that apparatus 1200 is represented as including functional blocks, which can be functional blocks that represent functions implemented by a processor, software, or combination thereof (e.g., firmware). Apparatus 1200 can be implemented by a Node B (e.g., base station 110) and can include a module 1202 for forming respective supergroups from respective indicator groups (e.g., PHICH groups) and a module 1204 for transmitting the formed supergroups using respective non-overlapping subsets of control resources.

Figure 13:
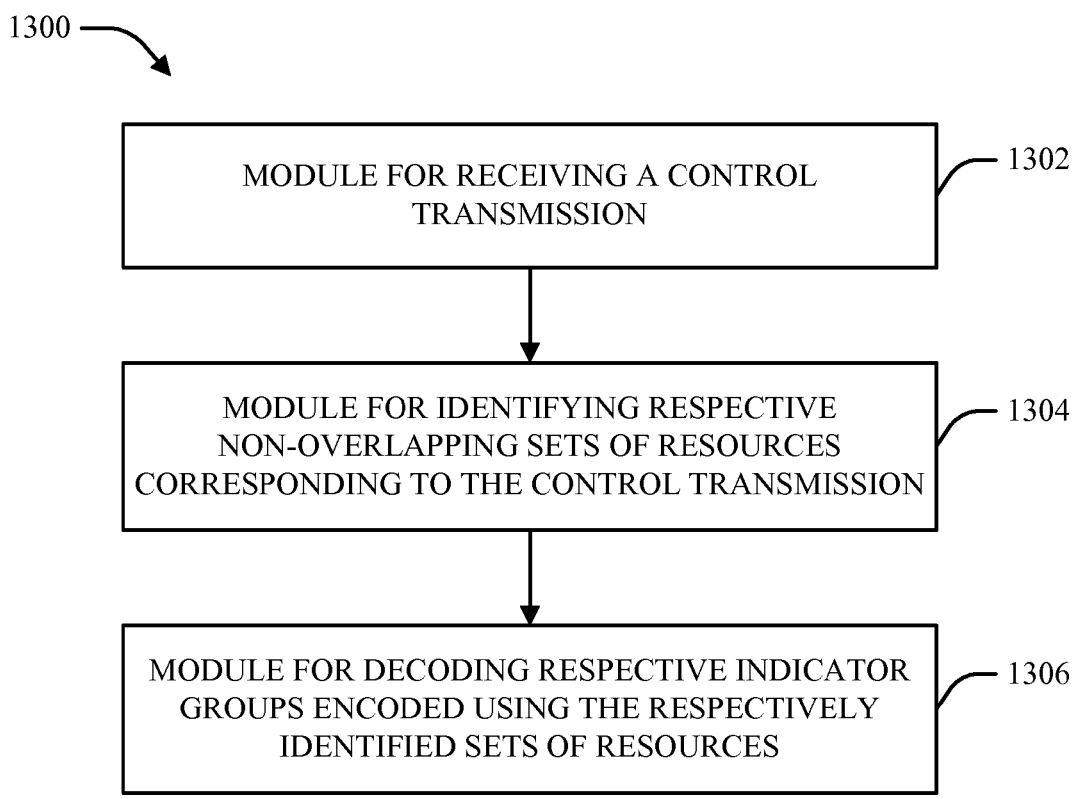

FIG. 13 illustrates another apparatus 1300 that facilitates management of resources associated with a control transmission. It is to be appreciated that apparatus 1300 is represented as including functional blocks, which can be functional blocks that represent functions implemented by a processor, software, or combination thereof (e.g., firmware). Apparatus 1300 can be implemented by a UE (e.g., terminal 130) and can include a module 1302 for receiving a control transmission, a module 1304 for identifying respective non-overlapping sets of resources corresponding to the control transmission, and a module 1306 for decoding respective indicator groups encoded using the respectively identified sets of resources.

Figure 14:
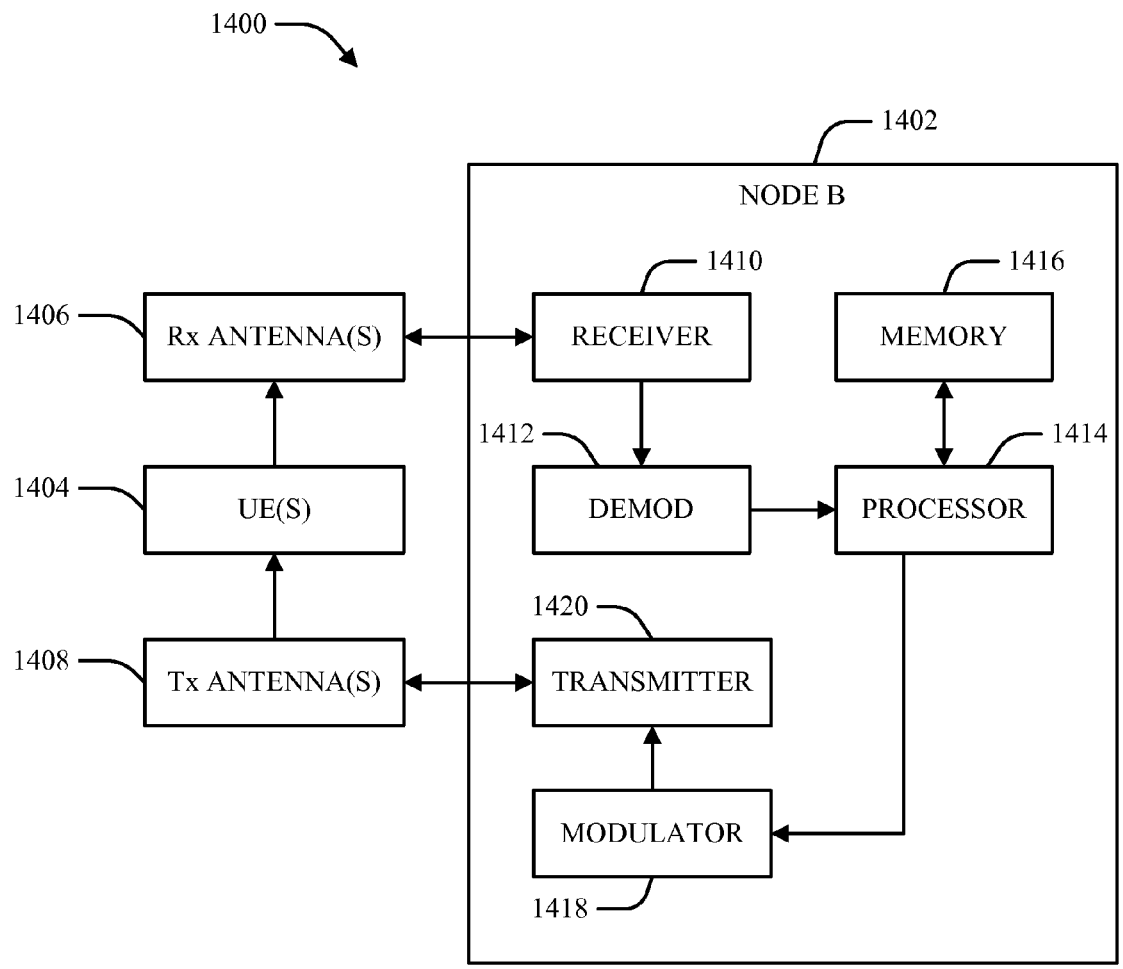
FIGS. 14-15 are block diagrams of respective wireless communication devices that can be utilized to implement various aspects of the functionality described herein.

FIG. 14 is a block diagram of a system 1400 that can be utilized to implement various aspects of the functionality described herein. In one example, system 1400 includes a base station or Node B 1402. As illustrated, Node B 1402 can receive signal(s) from one or more UEs 1404 via one or more receive (Rx) antennas 1406 and transmit to the one or more UEs 1404 via one or more transmit (Tx) antennas 1408. Additionally, Node B 1402 can comprise a receiver 1410 that receives information from receive antenna(s) 1406. In one example, the receiver 1410 can be operatively associated with a demodulator (Demod) 1412 that demodulates received information. Demodulated symbols can then be analyzed by a processor 1414. Processor 1414 can be coupled to memory 1416, which can store information related to code clusters, access terminal assignments, lookup tables related thereto, unique scrambling sequences, and/or other suitable types of information. In one example, Node B 1402 can employ processor 1414 to perform methodologies 700, 800, 900, 1000, and/or other similar and appropriate methodologies. Node B 1402 can also include a modulator 1418 that can multiplex a signal for transmission by a transmitter 1420 through transmit antenna(s) 1408.

Figure 15:
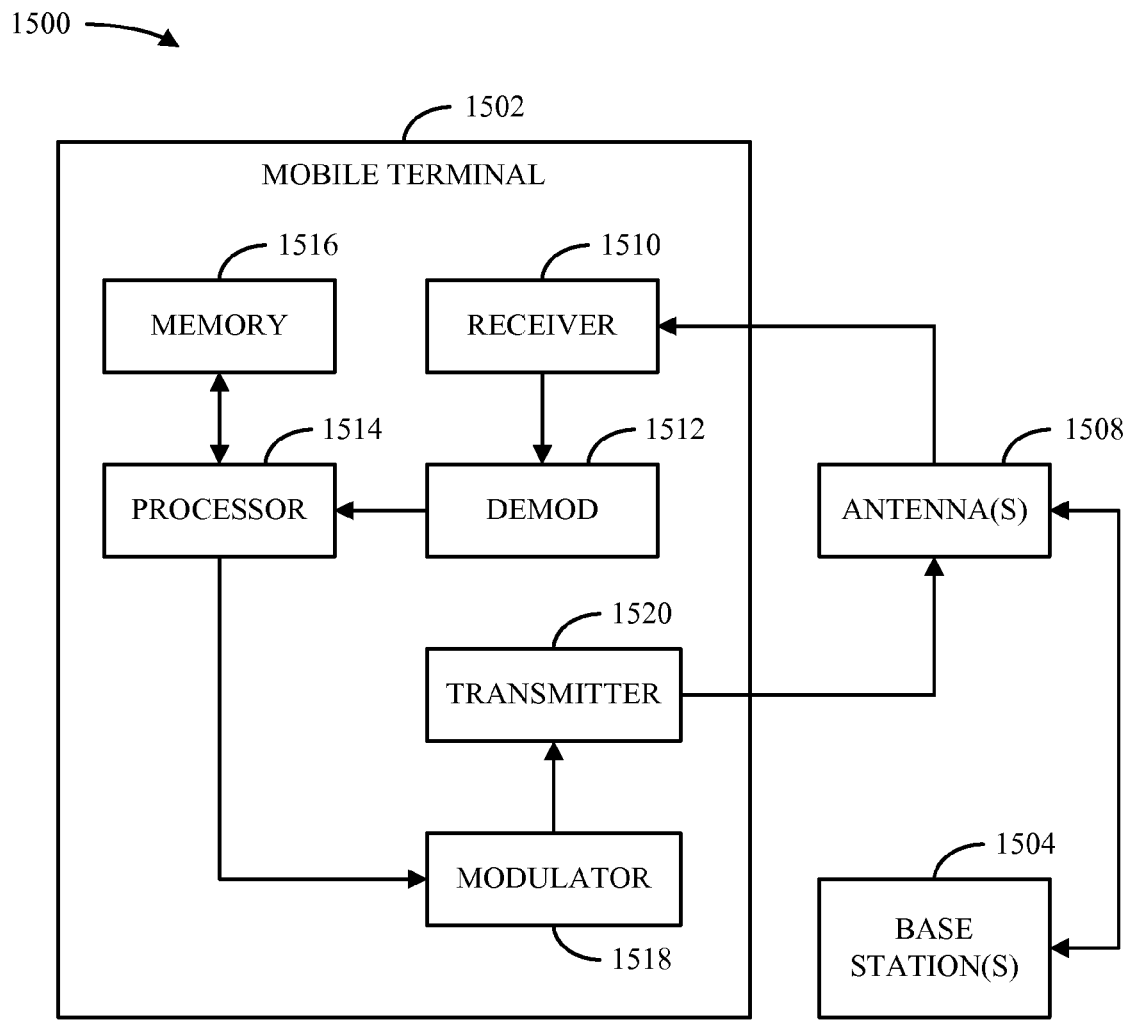

FIG. 15 is a block diagram of another system 1500 that can be utilized to implement various aspects of the functionality described herein. In one example, system 1500 includes a mobile terminal 1502. As illustrated, mobile terminal 1502 can receive signal(s) from one or more base stations 1504 and transmit to the one or more base stations 1504 via one or more antennas 1508. Additionally, mobile terminal 1502 can comprise a receiver 1510 that receives information from antenna(s) 1508. In one example, receiver 1510 can be operatively associated with a demodulator (Demod) 1512 that demodulates received information. Demodulated symbols can then be analyzed by a processor 1514. Processor 1514 can be coupled to memory 1516, which can store data and/or program codes related to mobile terminal 1502. Additionally, mobile terminal 1502 can employ processor 1514 to perform methodology 1100 and/or other similar and appropriate methodologies. Mobile terminal 1502 can also include a modulator 1518 that can multiplex a signal for transmission by a transmitter 1520 through antenna(s) 1508.

Figure 16:
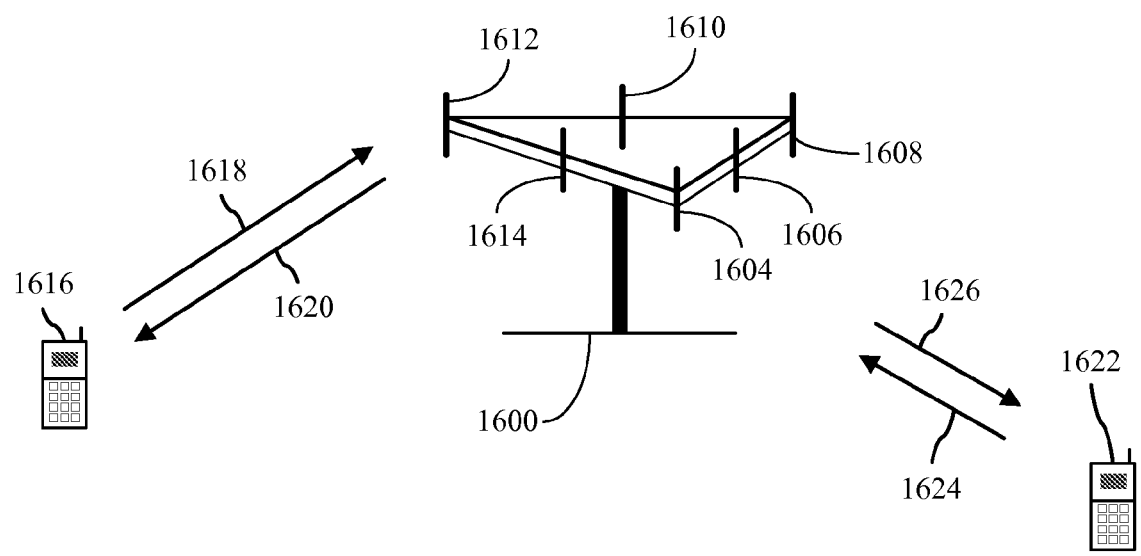
FIG. 16 illustrates a wireless multiple-access communication system in accordance with various aspects set forth herein.

Referring now to FIG. 16, an illustration of a wireless multiple-access communication system is provided in accordance with various aspects. In one example, an access point 1600 (AP) includes multiple antenna groups. As illustrated in FIG. 16, one antenna group can include antennas 1604 and 1606, another can include antennas 1608 and 1610, and another can include antennas 1612 and 1614. While only two antennas are shown in FIG. 16 for each antenna group, it should be appreciated that more or fewer antennas may be utilized for each antenna group. In another example, an access terminal 1616 can be in communication with antennas 1612 and 1614, where antennas 1612 and 1614 transmit information to access terminal 1616 over forward link 1620 and receive information from access terminal 1616 over reverse link 1618. Additionally and/or alternatively, access terminal 1622 can be in communication with antennas 1606 and 1608, where antennas 1606 and 1608 transmit information to access terminal 1622 over forward link 1626 and receive information from access terminal 1622 over reverse link 1624. In a frequency division duplex system, communication links 1618, 1620, 1624 and 1626 can use different frequency for communication. For example, forward link 1620 may use a different frequency then that used by reverse link 1618.

Each group of antennas and/or the area in which they are designed to communicate can be referred to as a sector of the access point. In accordance with one aspect, antenna groups can be designed to communicate to access terminals in a sector of areas covered by access point 1600. In communication over forward links 1620 and 1626, the transmitting antennas of access point 1600 can utilize beamforming in order to improve the signal-to-noise ratio of forward links for the different access terminals 1616 and 1622. Also, an access point using beamforming to transmit to access terminals scattered randomly through its coverage causes less interference to access terminals in neighboring cells than an access point transmitting through a single antenna to all its access terminals.

An access point, e.g., access point 1600, can be a fixed station used for communicating with terminals and can also be referred to as a base station, a Node B, an access network, and/or other suitable terminology. In addition, an access terminal, e.g., an access terminal 1616 or 1622, can also be referred to as a mobile terminal, user equipment, a wireless communication device, a terminal, a wireless terminal, and/or other appropriate terminology.

Figure 17:
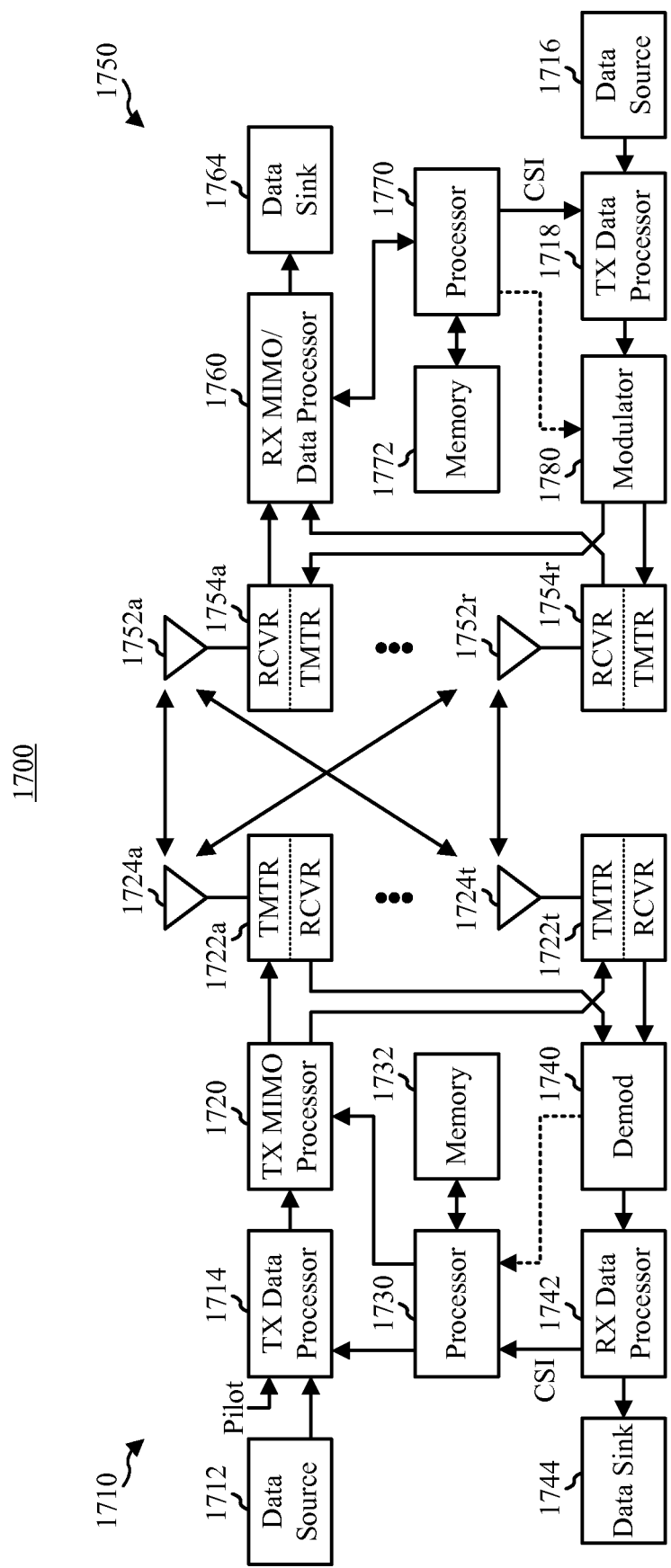
FIG. 17 is a block diagram illustrating an example wireless communication system in which various aspects described herein can function.

Referring now to FIG. 17, a block diagram illustrating an example wireless communication system 1700 in which various aspects described herein can function is provided. In one example, system 1700 is a multiple-input multiple-output (MIMO) system that includes a transmitter system 1710 and a receiver system 1750. It should be appreciated, however, that transmitter system 1710 and/or receiver system 1750 could also be applied to a multi-input single-output system wherein, for example, multiple transmit antennas (e.g., on a base station), can transmit one or more symbol streams to a single antenna device (e.g., a mobile station). Additionally, it should be appreciated that aspects of transmitter system 1710 and/or receiver system 1750 described herein could be utilized in connection with a single output to single input antenna system.

In accordance with one aspect, traffic data for a number of data streams are provided at transmitter system 1710 from a data source 1712 to a transmit (TX) data processor 1714. In one example, each data stream can then be transmitted via a respective transmit antenna 1724. Additionally, TX data processor 1714 can format, encode, and interleave traffic data for each data stream based on a particular coding scheme selected for each respective data stream in order to provide coded data. In one example, the coded data for each data stream can then be multiplexed with pilot data using OFDM techniques. The pilot data can be, for example, a known data pattern that is processed in a known manner. Further, the pilot data can be used at receiver system 1750 to estimate channel response. Back at transmitter system 1710, the multiplexed pilot and coded data for each data stream can be modulated (i.e., symbol mapped) based on a particular modulation scheme (e.g., BPSK, QSPK, M-PSK, or M-QAM) selected for each respective data stream in order to provide modulation symbols. In one example, data rate, coding, and modulation for each data stream can be determined by instructions performed on and/or provided by processor 1730.

Next, modulation symbols for all data streams can be provided to a TX processor 1720, which can further process the modulation symbols (e.g., for OFDM). TX MIMO processor 1720 can then provides $N_T$ modulation symbol streams to $N_T$ transceivers 1722a through 1722t. In one example, each transceiver 1722 can receive and process a respective symbol stream to provide one or more analog signals. Each transceiver 1722 can then further condition (e.g., amplify, filter, and upconvert) the analog signals to provide a modulated signal suitable for transmission over a MIMO channel. Accordingly, $N_T$ modulated signals from transceivers 1722a through 1722t can then be transmitted from $N_T$ antennas 1724a through 1724t, respectively.

In accordance with another aspect, the transmitted modulated signals can be received at receiver system 1750 by $N_R$ antennas 1752a through 1752r. The received signal from each antenna 1752 can then be provided to respective transceivers 1754. In one example, each transceiver 1754 can condition (e.g., filter, amplify, and downconvert) a respective received signal, digitize the conditioned signal to provide samples, and then processes the samples to provide a corresponding "received" symbol stream. An RX MIMO/data processor 1760 can then receive and process the $N_R$ received symbol streams from $N_R$ transceivers 1754 based on a particular receiver processing technique to provide $N_T$ "detected" symbol streams. In one example, each detected symbol stream can include symbols that are estimates of the modulation symbols transmitted for the corresponding data stream. RX processor 1760 can then process each symbol stream at least in part by demodulating, deinterleaving, and decoding each detected symbol stream to recover traffic data for a corresponding data stream. Thus, the processing by RX processor 1760 can be complementary to that performed by TX MIMO processor 1720 and TX data processor 1716 at transmitter system 1710. RX processor 1760 can additionally provide processed symbol streams to a data sink 1764.

In accordance with one aspect, the channel response estimate generated by RX processor 1760 can be used to perform space/time processing at the receiver, adjust power levels, change modulation rates or schemes, and/or other appropriate actions. Additionally, RX processor 1760 can further estimate channel characteristics such as, for example, signal-to-noise-and-interference ratios (SNRs) of the detected symbol streams. RX processor 1760 can then provide estimated channel characteristics to a processor 1770. In one example, RX processor 1760 and/or processor 1770 can further derive an estimate of the "operating" SNR for the system. Processor 1770 can then provide channel state information (CSI), which can comprise information regarding the communication link and/or the received data stream. This information can include, for example, the operating SNR. The CSI can then be processed by a TX data processor 1718, modulated by a modulator 1780, conditioned by transceivers 1754a through 1754r, and transmitted back to transmitter system 1710. In addition, a data source 1716 at receiver system 1750 can provide additional data to be processed by TX data processor 1718.

Back at transmitter system 1710, the modulated signals from receiver system 1750 can then be received by antennas 1724, conditioned by transceivers 1722, demodulated by a demodulator 1740, and processed by a RX data processor 1742 to recover the CSI reported by receiver system 1750. In one example, the reported CSI can then be provided to processor 1730 and used to determine data rates as well as coding and modulation schemes to be used for one or more data streams. The determined coding and modulation schemes can then be provided to transceivers 1722 for quantization and/or use in later transmissions to receiver system 1750. Additionally and/or alternatively, the reported CSI can be used by processor 1730 to generate various controls for TX data processor 1714 and TX MIMO processor 1720. In another example, CSI and/or other information processed by RX data processor 1742 can be provided to a data sink 1744.

In one example, processor 1730 at transmitter system 1710 and processor 1770 at receiver system 1750 direct operation at their respective systems. Additionally, memory 1732 at transmitter system 1710 and memory 1772 at receiver system 1750 can provide storage for program codes and data used by processors 1730 and 1770, respectively. Further, at receiver system 1750, various processing techniques can be used to process the $N_R$ received signals to detect the $N_T$ transmitted symbol streams. These receiver processing techniques can include spatial and space-time receiver processing techniques, which can also be referred to as equalization techniques, and/or "successive nulling/equalization and interference cancellation" receiver processing techniques, which can also be referred to as "successive interference cancellation" or "successive cancellation" receiver processing techniques.

It is to be understood that the aspects described herein can be implemented by hardware, software, firmware, middleware, microcode, or any combination thereof. When the systems and/or methods are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method for managing control resources in a wireless communication system, comprising:
    identifying a set of control channel groups associated with a first spreading factor and a corresponding set of control resources;
    grouping the set of control channel groups into N supergroups for a predetermined integer N, each supergroup having a plurality of different control channel groups, each supergroup being associated with a second spreading factor that is greater than the first spreading factor;
    dividing the set of control resources into N non-overlapping subsets; and
    mapping the supergroups to respective subsets of the control resources;
    wherein the predetermined integer N is equal to 2;
    wherein the wireless communication system utilizes an extended cyclic prefix;
    the first spreading factor being expanded to the second spreading factor at least in part by appending zeros to the first spreading factor at a first set of code positions for respective control channel groups in a first supergroup and at a second set of code positions that is non-overlapping with the first set of code positions for respective control channel groups in a second supergroup.

2. The method of claim 1, wherein the control channel groups are Physical Hybrid Automatic Repeat Request Indicator Channel (PHICH) groups.

3. The method of claim 1, wherein the grouping comprises:
    grouping odd-indexed control channel groups into the first supergroup; and
    grouping even-indexed control channel groups into the second supergroup.

4. The method of claim 1, wherein the set of control channel groups comprises four control channel groups and each supergroup comprises two control channel groups.

5. The method of claim 1, wherein the set of control resources corresponds to a resource element group (REG) comprising four resource elements.

6. The method of claim 5, wherein:
the grouping comprises grouping respective control channel groups in the set of control channel groups into the first supergroup and the second supergroup; and
the mapping comprises mapping the first supergroup to a first resource element and a second resource element in the REG and mapping the second supergroup to a third resource element and a fourth resource element in the REG that are respectively different from the first resource element and the second resource element.

7. The method of claim 1, further comprising transmitting the control channel groups to at least one terminal using the control resources to which the control channel groups are respectively mapped.

8. The method of claim 7, wherein the transmitting comprises transmitting the control channel groups using at least one transmit antenna.

9. The method of claim 1, in which the first spreading factor is two (SF2) and the second spreading factor is four (SF4).

10. A wireless communications apparatus operable in a wireless communication system, comprising:
a memory; and
a processor coupled to the memory and configured to:
identify a set of control channel groups associated with a first spreading factor and a corresponding set of control resources;
group the set of control channel groups into N supergroups for a predetermined integer N, each supergroup having a plurality of different control channel groups, each supergroup being associated with a second spreading factor that is greater than the first spreading factor;
divide the set of control resources into N non-overlapping subsets; and
map the supergroups to respective subsets of the control resources;
wherein the predetermined integer N is equal to 2;
wherein the wireless communication system utilizes an extended cyclic prefix (CP);
the first spreading factor being expanded to the second spreading factor at least in part by appending zeros to the first spreading factor at a first set of code positions for respective control channel groups in a first supergroup and at a second set of code positions that is non-overlapping with the first set of code positions for respective control channel groups in a second supergroup.

11. The wireless communications apparatus of claim 10, wherein the control channel groups are Physical Hybrid Automatic Repeat Request Indicator Channel (PHICH) groups.

12. The wireless communications apparatus of claim 10, wherein the processor is further configured to group odd-indexed control channel groups into the first supergroup and to group even-indexed control channel groups into the second supergroup.

13. The wireless communications apparatus of claim 10, wherein the plurality of control channel groups comprises four control channel groups.

14. The wireless communications apparatus of claim 10, wherein the communication resources comprise a resource element group (REG), the REG comprising four resource elements.

15. The wireless communications apparatus of claim 14, wherein the processor is further configured to map the first supergroup to first and second resource elements in the REG and to map the second supergroup to third and fourth resource elements in the REG, wherein the first and second resource elements in the REG are respectively different from the third and fourth resource elements in the REG.

16. The wireless communications apparatus of claim 10, wherein the processor is further configured to instruct transmission of the supergroups using the control resources to which the supergroups are mapped.

17. The wireless communications apparatus of claim 16, wherein the processor is further configured to transmit the supergroups using at least one transmit antenna.

18. An apparatus that facilitates control resource management in a wireless communication system, the apparatus comprising:
means for identifying a set of control channel groups associated with a first spreading factor and a corresponding set of control resources;
means for grouping the set of control channel groups into N supergroups for a predetermined integer N, each supergroup having a plurality of different control channel groups, each supergroup being associated with a second spreading factor that is greater than the first spreading factor;
means for dividing the set of control resources into N non-overlapping subsets; and
means for mapping the supergroups to respective subsets of the control resources;
wherein the predetermined integer N is equal to 2;
wherein the wireless communication system utilizes an extended cyclic prefix (CP);
the first spreading factor being expanded to the second spreading factor at least in part by appending zeros to the first spreading factor at a first set of code positions for respective control channel groups in a first supergroup and at a second set of code positions that is non-overlapping with the first set of code positions for respective control channel groups in a second supergroup.

19. The apparatus of claim 18, wherein the control channel groups respectively comprise at least one Physical Hybrid Automatic Repeat Request Indicator Channel (PHICH).

20. The apparatus of claim 18, further comprising:
means for mapping respective control channel groups in the even supergroup to a first set of resource elements using a first symbol sequence; and
means for mapping respective control channel groups in the odd supergroup to a first second of resource elements using a second symbol sequence.

21. The apparatus of claim 18, further comprising means for transmitting the supergroups using the control resources to which the supergroups are respectively associated.

22. A non-transitory computer-readable medium, comprising:
code for causing at least one computer to identify a set of control channel groups associated with a first spreading factor and a corresponding set of control resources;
code for causing the at least one computer to group the set of control channel groups into N supergroups for a predetermined integer N, each supergroup having a plurality of different control channel groups, each supergroup being associated with a second spreading factor that is greater than the first spreading factor;
code for causing the at least one computer to divide the set of control resources into N non-overlapping subsets; and
code for causing the at least one computer to map the supergroups to respective subsets of the control resources;
wherein the predetermined integer N is equal to 2;
wherein a wireless communication system utilizes an extended cyclic prefix (CP);
the first spreading factor being expanded to the second spreading factor at least in part by appending zeros to the first spreading factor at a first set of code positions for respective control channel groups in a first supergroup and at a second set of code positions that is non-overlapping with the first set of code positions for respective control channel groups in a second supergroup.

23. The computer-readable medium of claim 22, further comprising code for causing the at least one computer to group odd-indexed control channel groups into the first supergroup and to group even-indexed control channel groups into the second supergroup.

24. The computer-readable medium of claim 22, further comprising code for causing at least one computer to transmit each supergroup using the control resources to which each supergroup is mapped.

25. A method for identifying resources associated with a control transmission, comprising:
receiving a transmission from a base station that spans an identified set of control resources and that utilizes an extended cyclic prefix;
identifying a first subset of the control resources and a second, non-overlapping subset of the control resources, wherein a first supergroup of odd-indexed channel control groups are multiplexed over the first subset of control resources, and a second supergroup of even-indexed control channel groups are multiplexed over the second subset of control resources, the first supergroup having a plurality of different odd-indexed channel control groups and the second supergroup having a plurality of different even-indexed control channel groups, each control channel group being associated with a first spreading factor, and each supergroup being associated with a second spreading factor that is greater than the first spreading factor, the first spreading factor being expanded to the second spreading factor at least in part by appending zeros to the first spreading factor at a first set of code positions for respective control channel groups in the first supergroup and at a second set of code positions that is non-overlapping with the first set of code positions for respective control channel groups in the second supergroup;
identifying a control channel within the transmission to be decoded;
determining a subset of the control resources associated with the control channel to be decoded from the first subset of the control resources or the second subset of the control resources; and
decoding the control channel from the identified subset of the control resources.

26. The method of claim 25, wherein the identifying comprises identifying a PHICH to be decoded.

27. The method of claim 26, wherein the decoding comprises determining an orthogonal sequence associated with the control channel.

28. The method of claim 25, wherein the identifying comprises determining at least one control channel to be decoded based on information received from the base station.

29. A wireless communications apparatus, comprising:
a memory; and
a processor coupled to the memory and configured to:
receive a transmission from a base station that spans an identified set of control resources and that utilizes an extended cyclic prefix,
identify a first subset of the control resources associated with a first supergroup comprising a plurality of odd-indexed channel control groups and a second non-overlapping subset of the control resources associated with a second supergroup comprising a plurality of even-indexed control channel groups, each channel control group being associated with a first spreading factor, and each supergroup being associated with a second spreading factor that is greater than the first spreading factor, the first spreading factor being expanded to the second spreading factor at least in part by appending zeros to the first spreading factor at a first set of code positions for respective control channel groups in the first supergroup and at a second set of code positions that is non-overlapping with the first set of code positions for respective control channel groups in the second supergroup,
identify a control channel within the transmission to be decoded;
determine a subset of the control resources associated with the control channel to be decoded from the first subset of the control resources or the second subset of the control resources, and
decode the control channel from the identified subset of the control resources.

30. The wireless communications apparatus of claim 29, wherein the control channel associated with the wireless communications apparatus includes a Physical Hybrid Automatic Repeat Request Indicator Channel (PHICH).

31. The wireless communications apparatus of claim 29, wherein the processor is further configured to determine an orthogonal sequence associated with the control channel associated with the wireless communications apparatus and to decode the control channel based on the determined orthogonal sequence.

32. An apparatus for wireless communication, the apparatus comprising:
means for receiving a transmission from a base station that spans an identified set of control resources and that utilizes an extended cyclic prefix;
means for identifying a first subset of the control resources and a second, non-overlapping subset of the control resources, wherein a first supergroup of odd-indexed channel control groups are multiplexed over the first subset of control resources, and a second supergroup of even-indexed control channel groups are multiplexed over the second subset of control resources, the first supergroup having a plurality of different odd-indexed channel control groups and the second supergroup having a plurality of different even-indexed control channel groups, each control channel group being associated with a first spreading factor, and each supergroup being associated with a second spreading factor that is greater than the first spreading factor, the first spreading factor being expanded to the second spreading factor at least in part by appending zeros to the first spreading factor at a first set of code positions for respective control channel groups in the first supergroup and at a second set of code positions that is non-overlapping with the first set of code positions for respective control channel groups in the second supergroup;

means for identifying a control channel within the transmission to be decoded;

means for determining a subset of the control resources associated with the control channel to be decoded from the first subset of the control resources or the second subset of the control resources; and means for decoding the control channel from the identified subset of the control resources.

33. The apparatus of claim 32, wherein the control channel associated with the apparatus includes a Physical Hybrid Automatic Repeat Request Indicator Channel (PHICH).

34. The apparatus of claim 32, further comprising means for determining an orthogonal sequence associated with the control channel associated with the wireless communications apparatus and means for decoding the control channel based on the determined orthogonal sequence.

35. A non-transitory computer-readable medium, comprising:

code for causing at least one computer to receive a transmission from a base station that spans an identified set of control resources and that utilizes an extended cyclic prefix;

code for causing the at least one computer to identify a first subset of the control resources and a second, non-overlapping subset of the control resources, wherein a first supergroup of odd-indexed channel control groups are multiplexed over the first subset of control resources, and a second supergroup of even-indexed control channel groups are multiplexed over the second subset of control resources, the first supergroup having a plurality of different odd-indexed channel control groups and the second supergroup having a plurality of different even-indexed control channel groups, each control channel group being associated with a first spreading factor, and each supergroup being associated with a second spreading factor that is greater than the first spreading factor, the first spreading factor being expanded to the second spreading factor at least in part by appending zeros to the first spreading factor at a first set of code positions for respective control channel groups in the first supergroup and at a second set of code positions that is non-overlapping with the first set of code positions for respective control channel groups in the second supergroup;

code for causing the at least one computer to identify a control channel within the transmission to be decoded;

code for causing the at least one computer to determine a subset of the control resources associated with the control channel to be decoded from the first subset of the control resources or the second subset of the control resources; and code for causing the at least one computer to decode the control channel from the identified subset of the control resources.

36. The computer-readable medium of claim 35, further comprising code for causing the at least one computer to determine an orthogonal sequence associated with the control channel associated with the wireless communications apparatus and to decode the control channel based on the determined orthogonal sequence.

* * * * *